(12) United States Patent
Sheinman

(10) Patent No.: US 10,828,824 B2
(45) Date of Patent: Nov. 10, 2020

(54) METHOD FOR DIRECT INKJET PRINTING OF 3D OBJECTS

(71) Applicant: Stratasys Ltd., Rehovot (IL)

(72) Inventor: Yehoshua Sheinman, RaAnana (IL)

(73) Assignee: Stratasys Ltd., Rehovot (IL)

( * ) Notice: Subject to any disclaimer, the term of this patent is extended or adjusted under 35 U.S.C. 154(b) by 361 days.

(21) Appl. No.: 15/893,880

(22) Filed: Feb. 12, 2018

(65) Prior Publication Data

US 2018/0229425 A1    Aug. 16, 2018

Related U.S. Application Data

(62) Division of application No. 14/440,613, filed as application No. PCT/IL2013/050908 on Nov. 5, 2013, now abandoned.

(Continued)

(51) Int. Cl.
*B29C 33/44* (2006.01)
*B29C 33/52* (2006.01)
(Continued)

(52) U.S. Cl.
CPC .......... *B29C 64/112* (2017.08); *B29C 33/448* (2013.01); *B29C 64/106* (2017.08); *B29C 64/188* (2017.08); *B29C 64/209* (2017.08); *B29C 64/245* (2017.08); *B29C 64/25* (2017.08); *B29C 64/295* (2017.08); *B29C 64/364* (2017.08); *B29C 64/40* (2017.08);
(Continued)

(58) Field of Classification Search
CPC ....... B29C 33/44; B29C 33/448; B29C 33/52; B29C 64/106; B29C 64/112; B29C 64/188; B29C 64/40; B29C 71/02; B33Y 10/00; B33Y 40/00; B33Y 40/20; B33Y 70/10
USPC .......................................... 264/234, 308, 317
See application file for complete search history.

(56) References Cited

U.S. PATENT DOCUMENTS 4,403,229 A    9/1983 Barteck
4,614,948 A    9/1986 Katerberg et al.
(Continued)

FOREIGN PATENT DOCUMENTS

CA    2355533    2/2002
CN    103180125    6/2013
(Continued)

OTHER PUBLICATIONS

Notice of Reason for Rejection Dated May 28, 2019 From the Japan Patent Office Re. Application No. 2018-162423 and Its Translation Into English. (6 Pages).
(Continued)

*Primary Examiner* — Leo B Tentoni

(57) ABSTRACT

A direct inkjet printing system for fabricating a part by an additive manufacturing process includes an ink delivery system operative to circulate the ink, a printhead associated with the ink delivery system, the printhead operative to dispense ink from the ink delivery system through a plurality of nozzles and based on a defined pattern, a building table for receiving the dispensed ink one layer at a time based on the defined pattern, wherein the part is formed from a plurality of layers of the ink dispensed from the printhead and a drying station operative to perform a drying process on layers of the ink dispensed from the printhead on a per layer basis.

14 Claims, 17 Drawing Sheets

Related U.S. Application Data

(60) Provisional application No. 61/722,433, filed on Nov. 5, 2012.

(51) Int. Cl.

| | | |
|---|---|---|
| *B29C 71/02* | (2006.01) | |
| *B29C 64/112* | (2017.01) | |
| *B29C 64/209* | (2017.01) | |
| *B29C 64/245* | (2017.01) | |
| *B29C 64/25* | (2017.01) | |
| *B29C 64/295* | (2017.01) | |
| *B29C 64/364* | (2017.01) | |
| *B29C 64/106* | (2017.01) | |
| *B29C 64/188* | (2017.01) | |
| *B29C 64/40* | (2017.01) | |
| *B33Y 30/00* | (2015.01) | |
| *B33Y 10/00* | (2015.01) | |
| *B29L 9/00* | (2006.01) | |

(52) U.S. Cl.
CPC ........... *B33Y 30/00* (2014.12); *B29L 2009/00* (2013.01); *B33Y 10/00* (2014.12)

(56) References Cited

U.S. PATENT DOCUMENTS

| | | | |
|---|---|---|---|
| 5,204,055 | A | 4/1993 | Sachs et al. |
| 5,902,441 | A | 5/1999 | Bredt et al. |
| 6,158,838 | A | 12/2000 | Capurso |
| 6,322,728 | B1 | 11/2001 | Brodkin et al. |
| 6,357,855 | B1 * | 3/2002 | Kerekes ............... B29C 64/112 347/40 |
| 7,141,207 | B2 | 11/2006 | Jandeska, Jr. et al. |
| 7,896,639 | B2 | 3/2011 | Kritchman et al. |
| 8,091,987 | B2 | 1/2012 | Van Den Bergen |
| 2003/0160852 | A1 | 8/2003 | Pickup |
| 2005/0104241 | A1 | 5/2005 | Kritchman |
| 2005/0197431 | A1 | 9/2005 | Bredt et al. |
| 2006/0054039 | A1 | 3/2006 | Kritchman et al. |
| 2006/0061613 | A1 | 3/2006 | Fienup et al. |
| 2006/0061618 | A1 | 3/2006 | Hernandez et al. |
| 2009/0145357 | A1 | 6/2009 | Kritchman et al. |
| 2010/0121476 | A1 | 5/2010 | Kritchman |
| 2010/0171792 | A1 * | 7/2010 | Sidhu ................... B29C 64/106 347/44 |
| 2010/0195122 | A1 | 8/2010 | Kritchman |
| 2010/0278952 | A1 | 11/2010 | Silverbrook |
| 2012/0105534 | A1 | 5/2012 | Boday et al. |
| 2013/0077996 | A1 | 3/2013 | Hanson et al. |
| 2014/0162033 | A1 | 6/2014 | Giller |
| 2015/0298394 | A1 | 10/2015 | Sheinman |

FOREIGN PATENT DOCUMENTS

| | | |
|---|---|---|
| EP | 1108546 | 6/2001 |
| EP | 1498277 | 1/2005 |
| EP | 2189272 | 5/2010 |
| JP | 06-198746 | 7/1994 |
| JP | 2001-171136 | 6/2001 |
| JP | 2001-334582 | 12/2001 |
| JP | 2002-507940 | 3/2002 |
| JP | 2008-513199 | 5/2008 |
| JP | 2008-513252 | 5/2008 |
| JP | 2010-030314 | 2/2010 |
| JP | 2012-111226 | 6/2012 |
| WO | WO 98/56566 | 12/1998 |
| WO | WO 01/13814 | 3/2001 |
| WO | WO 2004/005014 | 1/2004 |
| WO | WO 2012/058278 | 5/2012 |
| WO | WO 2014/068579 | 5/2014 |

OTHER PUBLICATIONS

Applicant-Initiated Interview Summary Dated Jun. 15, 2017 From the US Patent and Trademark Office Re. U.S. Appl. No. 14/440,613. (2 Pages).
International Preliminary Report on Patentability Dated May 14, 2015 From the International Bureau of WIPO Re. Application No. PCT/IL2013/050908.
International Search Report and the Written Opinion Dated Mar. 2, 2014 From the International Searching Authority Re. Application No. PCT/IL2013/050908.
Notice of Reason for Rejection Dated Aug. 8, 2017 From the Japan Patent Office Re. Application No. 2015-540275. (2 Pages).
Notification of Office Action and Search Report Dated Mar. 1, 2016 From the State Intellectual Property Office of the People's Republic of China Re. Application No. 201380069320.6 and Its Summary of Office Action in English.
Office Action Dated Nov. 1, 2016 From the State Intellectual Property Office of the People's Republic of China Re. Application No. 201380069320.6 and Its Translation Into English. (7 Pages).
Official Action Dated Feb. 10, 2017 From the US Patent and Trademark Office Re. U.S. Appl. No. 14/440,613. (24 pages).
Official Action Dated Sep. 11, 2017 From the US Patent and Trademark Office Re. U.S. Appl. No. 14/440,613. (24 pages).
Restriction Official Action Dated Sep. 29, 2016 From the US Patent and Trademark Office Re. U.S. Appl. No. 14/440,613.
Supplementary European Search Report Dated Jun. 7, 2016 From the European Patent Office Re. Application No. 13852044.0.
Translation of Notice of Reason for Rejection Dated Aug. 8, 2017 From the Japan Patent Office Re. Application No. 2015-540275. (5 Pages).
Seerden et al. "Ink-Jet Printing of Wax-Based Alumina Suspensions", Journal of the American Ceramic Society, 84(11): 2514-2520, 2001.
Grounds of Reasons for Rejection Dated Feb. 27, 2020 From the Korean Intellectual Property Office Re. Application No. 10-2015-7014642 and Its Translation Into English.

* cited by examiner

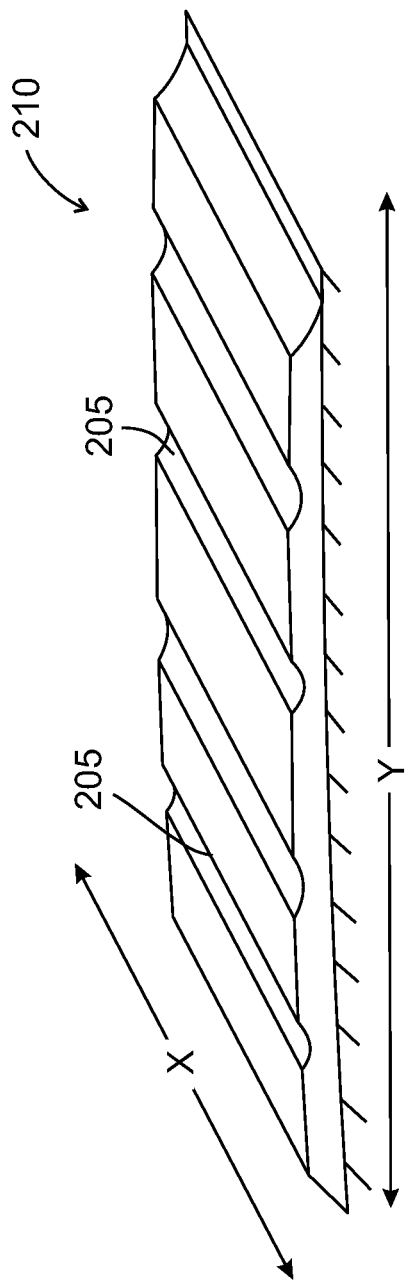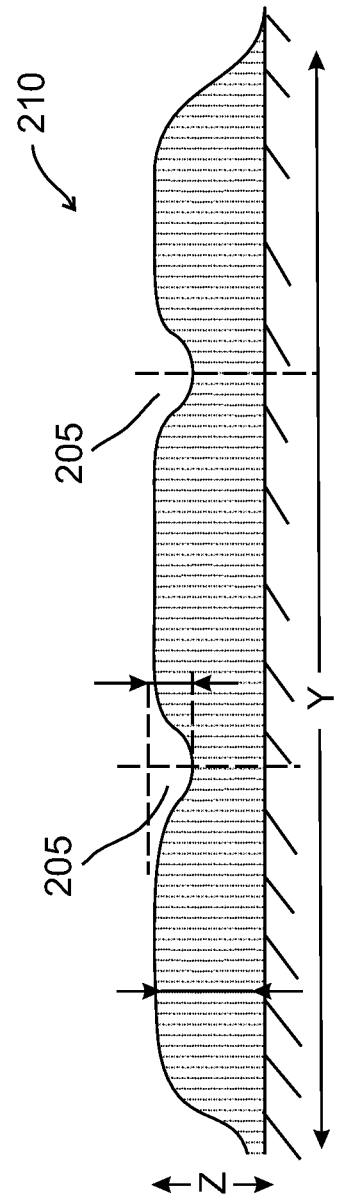
FIG. 11A
FIG. 11B

METHOD FOR DIRECT INKJET PRINTING OF 3D OBJECTS

RELATED APPLICATIONS

This application is a division of U.S. patent application Ser. No. 14/440,613 filed on May 5, 2015, which is a National Phase of PCT Patent Application No. PCT/IL2013/050908 having International Filing Date of Nov. 5, 2013, which claims the benefit of priority under 35 USC § 119(e) of U.S. Provisional Patent Application No. 61/722,433 filed on Nov. 5, 2012. The contents of the above applications are all incorporated by reference as if fully set forth herein in their entirety.

FIELD AND BACKGROUND OF THE INVENTION

The present invention, in some embodiments thereof, relates to additive manufacturing and/or 3D printing and, more particularly, but not exclusively, to 3D printing for rapid manufacturing.

A number of different processes for fabricating solid objects by 3D printing are known. Typically, the processes successively print layers of material in different shapes based on a 3D model of the object. The different processes typically differ in the way layers are deposited and in the materials that can be used.

U.S. Pat. No. 6,322,728 entitled "Mass production of dental restorations by solid free-form fabrication methods," the contents of which is incorporated herein by reference, describes processes for manufacturing dental restorations. One process includes ink-jet printing a binder into selected areas of sequentially deposited layers of powder. Each layer is created by spreading a thin layer of powder over the surface of a powder bed. Instructions for each layer may be derived directly from a CAD representation of the restoration. While the layers become hardened or at least partially hardened as each of the layers is laid down, once the desired final shaped configuration is achieved and the layering process is complete, in some applications it may be desirable that the form and its contents be heated or cured at a suitably selected temperature to further promote binding of the powder particles. Another process includes providing a mixture of powder material dispersed in a binder; and dispensing the mixture from a dispensing apparatus onto a platform. A slurry or paste of a polymer or ceramic powder is mixed with a carrier formed into a coping of a multi-layered final shape of a dental restoration using a machine similar to a fused deposition modeling machine. This machine emits or sprays beads of slurries as opposed to a fused deposition modeling machine which emits liquefied thermoplastic materials.

U.S. Pat. No. 7,896,639 entitled "Rapid Prototyping Apparatus," the contents of which is incorporated herein by reference, describes an inkjet type of apparatus for producing an object by sequentially forming thin layers of a photopolymer material one on top of the other responsive to data defining the object. The apparatus includes a plurality of printing heads each having a surface formed with a plurality of output orifices and controllable to dispense the construction material through each orifice independently of the other orifices and a shuttle to which the printing heads are mounted. A controller moves the shuttle back and forth over a support surface and as the shuttle moves controls the printing heads to dispense the construction material responsive to the data to form a first layer on the support surface and thereafter, sequentially the other layers. Typically, UV radiation is used to cure each of the layers of photopolymer material.

An article published in the Journal of the American Ceramic Society, 85 [110 2514-20 (2001), entitled "Ink-Jet Printing of Wax-Based Alumina Suspensions," the contents of which is incorporated herein by reference, describes a method for producing solid bodies that contain ceramic particles dispersed in low-melting-point waxes. Suspensions of fine alumna powder in a paraffin wax were formulated with viscosity values sufficiently low to allow ink-jet printing using a commercial printer. Suspensions with powder loading of up to 40 volume percent were passed through the ink-jet printer head. A direct ink-jet printing process was used to fabricate the solid bodies with the formulated suspensions in wax.

Inkjet printers are also known to be used for printing information on paper. One source of operation failure of inkjet printers used for printing on paper can be caused by sedimentation and evaporation of components in the ink being dispensed through the nozzles and/or orifices. For example during periods of non-use, the ink that is retained in the print head may deteriorate and lead to sedimentation of solid particles. Deterioration of the ink may also include evaporation of components contained in the ink. This may lead to a change in viscosity of the ink in the vicinity of the nozzle, having a negative effect on its jetting properties. Sedimentation and evaporation may potentially lead to a nozzle fall out or nozzle blockage.

U.S. Pat. No. 8,091,987 entitled "Ink jet print head with improved reliability," the contents of which is incorporated herein by reference, describes a method for refreshing ink that will be used for ejecting through the nozzle of a print head. The method includes creating an ink flow in excess of that required to replenish drops ejected from the print head, and passing that flow of ink along the inner end of the nozzle and through an ink path in a nozzle plate of the print head. The ink flow refreshes the ink that will be used for ejecting through the nozzle.

SUMMARY OF THE INVENTION

According to an aspect of some embodiments of the present invention there is provided a system and method for manufacturing ceramic, metal and/or high quality polymer parts using a direct inkjet printing process. According to some embodiments of the present invention, the ceramic, metal and/or high quality polymer parts are fabricated with ink formulated with a high volume percentage of high density pigment and/or particles such as ceramic powder, encapsulated metal micro-particles, and/or soluble polymer. Optionally the ink is one of water based ink or solvent based ink. According to some embodiments of the present invention, the system and method provides for direct inkjet printing with such ink that typically has high viscosity, poor dispersion stability and/or high solvent evaporation rate. According to some embodiments of the present invention, ceramic and/or metal parts formed with the direct inkjet printing process are adapted for sintering.

An aspect of some embodiments of the present invention provides for a direct inkjet printing system for fabricating a part by an additive manufacturing process, the system comprising: an ink delivery system operative to circulate the ink; a printhead associated with the ink delivery system, the printhead operative to dispense ink from the ink delivery system through a plurality of nozzles and based on a defined pattern; a building table for receiving the dispensed ink one layer at a time based on the defined pattern, wherein the part is formed from a plurality of layers of the ink dispensed from the printhead; and a drying station operative to perform a drying process on layers of the ink dispensed from the printhead on a per layer basis.

Optionally, the building table is movable in the printing direction and in the cross printing direction for scanning the plurality of layers while the printhead dispenses the ink.

Optionally, the building table includes a building platform that is rotatable.

Optionally, the building table is operable to advance into the drying station on the per layer basis.

Optionally, the building table includes a removable tray adapted for being placed in a sintering oven.

Optionally, the system includes a mat positioned on the building table, wherein the mat is operative to receive the dispensed material.

Optionally, the mat is adapted to provide a surface tension that is higher than a surface tension of the ink dispensed thereon.

Optionally, the mat is inkjet paper.

Optionally, the drying station comprises: a housing; a sliding door for receiving the building table into the housing; a blower operative for circulating air in the housing; and a heating unit operative to heat the air circulated by the blower.

Optionally, the drying station is operative to impinge jets of hot air on the layers of the ink dispensed on the building table.

Optionally, the drying station includes a nozzle plate through which the hot air is jetted.

Optionally, the system includes two drying stations.

Optionally, the system includes a first printhead for dispensing building material and a second printhead for dispensing support material.

Optionally, the ink that is dispensed by the printing head has a viscosity of 10-20 cps.

Optionally, the ink that is dispensed by the printing head ink that is formulated with at least one of ceramic powder, encapsulated metal micro-particles and soluble polymer.

Optionally, the ink is water-based ink.

Optionally, the ink is solvent-based ink.

Optionally, the ink that is dispensed by the printhead is adapted for sintering.

Optionally, the ink delivery system is operative to circulate the ink with gravitation based circulation.

Optionally, the system includes a roller operative to flatten a plurality of layers at a time.

Optionally, the roller is operative to be lowered toward the dispensed ink on demand.

Optionally, the system includes a maintenance station operable to align with a position of the printhead during idle periods of the system and to be displaced from the printhead during printing, wherein the maintenance station comprises a nozzle operative to spray cleaning fluid on the printhead and blotting paper with a mechanism for raising the blotting paper toward the printhead.

An aspect of some embodiments of the present invention provides for a method for direct inkjet printing by an additive manufacturing process to fabricate a part, the method comprising: dispensing droplets of ink in a layerwise manner according to a pattern defined for fabricating the part, wherein the ink is formulated with at least one of ceramic powder, encapsulated metal micro-particles and soluble polymer; and drying the droplets of ink in a drying station on a per layer basis.

Optionally, the method includes printing a layer in a two step process, wherein the first step of the two step process includes scanning a first array of the droplets in a printing direction with one pixel gaps in a cross printing direction and wherein the second step of the two step process includes scanning a second array of the droplets in the printing direction with one pixel gaps in a cross printing direction, wherein the second array fills at least a portion of the one pixel gaps formed by the first array.

Optionally, the method includes drying the droplets of ink in the drying station after each of the first and second steps.

Optionally, the method includes dispensing droplets of support material in a layerwise manner according to a pattern defined for supporting the part during fabrication, wherein a layer of droplets of support material is dispensed subsequent to forming a corresponding layer of the droplets of ink for fabricating the part.

Optionally, the method includes rotating the layer by 90 degrees prior to printing a subsequent layer.

Optionally, the droplets of ink are dispensed with a printhead including an array of nozzles and wherein the printhead is displaced by a half a pixel distance in a crossing printing direction prior to printing a subsequent layer.

Optionally, the method includes flattening each of a plurality of layers at a time.

Optionally, the method includes sintering the part.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 11A and 11B are simplified schematic drawings of an exemplary complete printed layer after a drying process, shown in a perspective and front view respectively and in accordance with some embodiments of the present invention;

Figure 1:
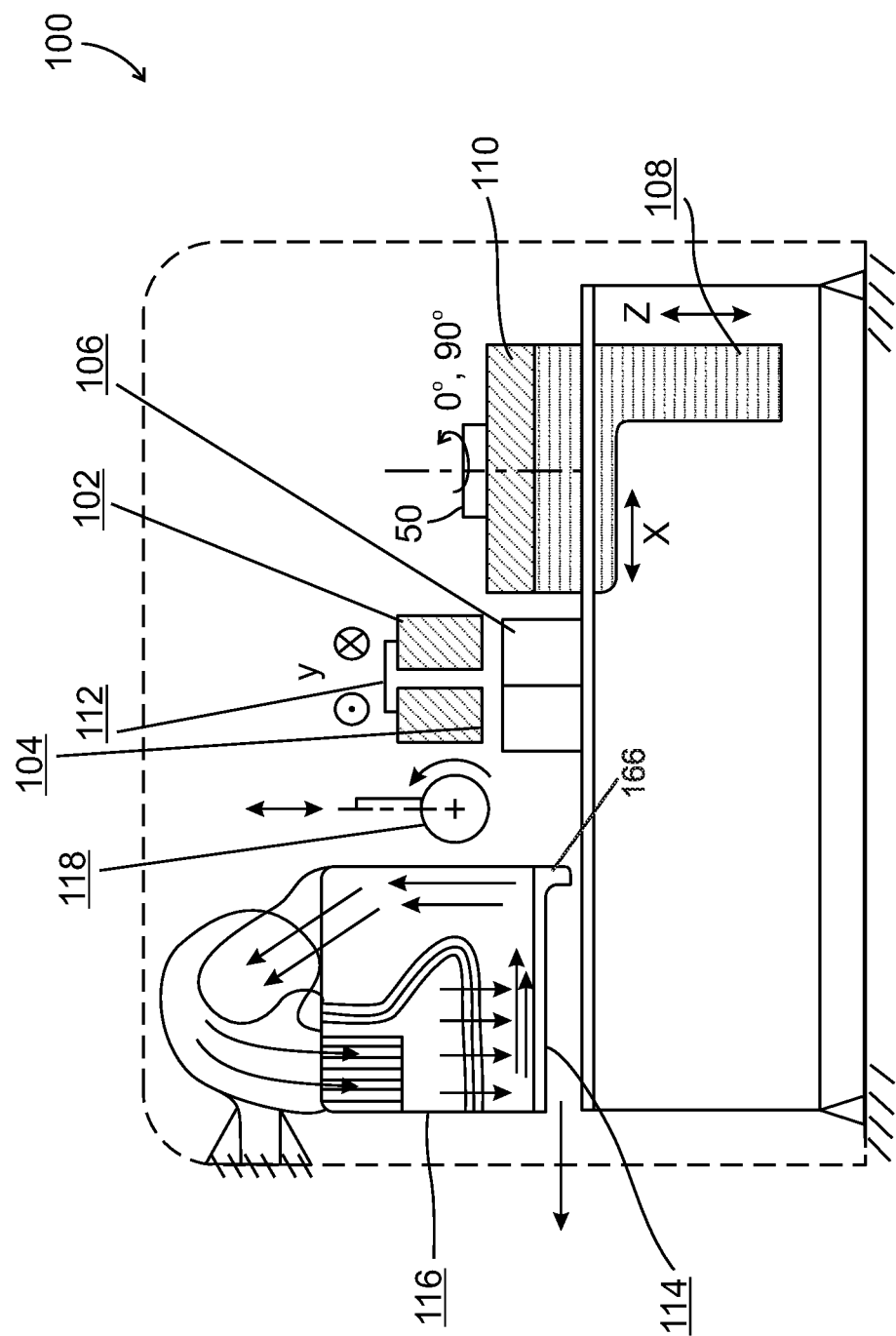
FIG. 1 is a simplified cross-sectional view of an exemplary direct inkjet printing system in accordance with some embodiments of the present invention.

DESCRIPTION OF SPECIFIC EMBODIMENTS
OF THE INVENTION

The present invention, in some embodiments thereof, relates to additive manufacturing and/or 3D printing and, more particularly, but not exclusively, to 3D printing for rapid manufacturing.

According to some exemplary embodiments there is provided a system and method using a direct inkjet printing process for fabricating 3D objects. As used herein, a direct inkjet printing process for fabricating 3D objects refers to a process for fabricating a 3D object by selectively dispensing droplets of ink as the construction and/or building material, one layer at a time based on a computed model of the 3D object. According to some embodiments of the present invention, the ink has high viscous properties, e.g. 10-20 cps due to its high volume percentage of ceramic powder, and/or encapsulated metal micro-particles. Alternatively, the construction material is a viscous ink that includes a soluble polymer. Optionally, support material for supporting a geometrical structure of the part during printing is also dispensed based on the computed model of the 3D object. In some exemplary embodiments, the support material is dispensed from a dedicated print head.

The present inventors have found that current developments in inkjet printhead technology that support circulation of ink with slow flow around the nozzle plate may also support printing with high viscosity inks as described herein. Typically, ceramic and/or metal inks as described herein have poor dispersion stability due to their high volume percentage of particles while polymer inks as described herein have a high solvent evaporation rate that is sensitive to heating. The present inventors have found that the circulation can replace the typical process of heating the ink during inkjet printing. Heating is typically accompanied by an increased dispersion instability and solvent evaporation.

According to some embodiments of the present invention, the system includes an ink delivery system for circulating the high viscosity ink to maintain dispersion stability of the ink, avoid sedimentation inside the printhead and/or prevent clogging of the nozzle due to particle sinking. According to some embodiments of the present invention, the ink delivery system uses gravitation for circulation generation. Optionally, the ink delivery system functions as a cartridge that can be replaced by a cleaning fluid cartridge or an alternate cartridge including different color ink. Optionally, the ink circulation per printhead provided by the ink delivery system can reach 20 to 65 cc/min, e.g. 50 cc/min. Typically, during circulation, air trapped in the ink is removed. In some exemplary embodiments, when gravitation is used to generate circulation, a purging device is included to provide pressure for nozzle cleaning.

The present inventor has found that direct inkjet printing as described herein may provide advantages over known methods for fabrication by printing. For example in known processes that print a binder into layers of powder, the surface quality of the object is known to be relatively rough, while direct inkjet processing as described herein may provide smooth glossy surfaces without need for a polishing and/or buffing process. In some applications such as applications for dental restoration, a highly polished finish is typically required.

The present invention may also provide advantages over known fabrication processes that use direct inkjet printing with low viscosity construction material, e.g. ceramic powder suspension in wax and then apply sintering. Inkjet printing processes that use low viscosity construction material are typically associated with a significant and/or an unpredictable degree of shrinkage during sintering. Rather, the present inventor has found that when using ink with high volume percentage of high density particles and/or content as described herein, sintering may be applied with little or no shrinkage of the part being built. The present inventor has also found that based on the system and method described herein, porosity resulting from binder removal may be minimal so that the mechanical properties of the part may be maintained after binder removal.

According to some embodiments of the present invention, the direct inkjet printing process as described herein can also be used to fabricate high quality plastic parts by using solvent soluble polymer, e.g. polyamide, as opposed to photopolymers. The present inventor has found that the quality, e.g. mechanical properties of these plastic parts when printed by direct inkjet printing as described herein may be comparable to like parts fabricated by injection molding. For some applications, cost for manufacturing by direct inkjet printing may be significantly lower than that for injection molding.

According to some embodiments of the present invention, a drying process is applied to each of the layers that are printed. Typically, the drying process is applied to evaporate the water and/or low boiling temperature solvents in the printed layer. Optionally, the drying process is also applied to humectants, high temperature boiling solvents and/or to activate the binder in the ink. In some exemplary embodiments, the drying process also provides for drying and/or solidifying supporting material that is dispensed together with building material.

According to some embodiments of the present invention, the system includes at least one drying station for performing the drying process. Typically, a building tray supporting the dispensed material is advanced into the drying station after each layer is printed and/or scanned. In some exemplary embodiments, each layer is printed in two steps including a first scanning step for dispensing ink with even nozzles and then a second scanning step for dispensing ink with odd nozzles. Optionally, scanning is performed first in one direction and then in the opposite direction. Optionally, drying is applied after each step. Optionally, the system includes two drying stations at opposite ends of the system and the building tray is alternately advanced into each one of the drying stations.

According to some embodiments of the present invention, flattening is applied for every plurality of layers, e.g. per several tens of layers to compensate for accumulated error in the model in the vertical direction, e.g. Z-axis direction. According to some embodiments of the present invention, system includes a flattening pressure roller for flattening the layers.

According to some embodiments of the present invention, a wetting surface is used for absorbing the water or solvent in the ink so that the structure of the droplets of ink is stable on the building surface until the drying process is initiated. Typically, the wetting surface is selected to have a surface tension higher than the surface tension of the ink on which the part is fabricated. In some exemplary embodiments, inkjet paper and/or paper coated with receptive coating, e.g. polyvinylpyrrolidone (PVP) coating is used as the wetting surface. Typically, the inkjet paper or the like is positioned on the building tray of the system and removed after building of the part is completed and/or burnt away after sintering.

The present inventor has found that while printing layers of ink droplets to form the part, ditches along the printing direction can appear on the top surface of the printed layer(s) due to the structure of the droplets. According to some embodiments of the present invention, the system is operable to shift a printing head of the system laterally by a half a pixel distance and/or half the distance between odd and even lines prior to printing a subsequent layer. Alternatively and/or additionally, the incremental printhead motion can be applied to reduce the nozzle density, e.g. the number of nozzles in the printhead and provide a tradeoff between number of printing nozzles (price) and the model building rate (throughput). For example, each layer may be printed in a two step process; scanning the layer with all nozzles over a first step, incrementally shifting the nozzles and then scanning the layer again with all nozzles over a second step. The process can then be repeated to form the next layer. Optionally, the printing head of the system is subsequently shifted laterally by a half a pixel distance to print the next layer.

According to some exemplary embodiments, the printing system includes a rotatable building table that is operable to rotate 90 degrees around its center prior to printing one or a plurality of subsequent layers so that the part is built in a crisscross fashion. Optionally, building in a crisscross fashion provides for avoiding ditch formation on the layer surface.

According to some embodiments of the present invention, the printing system includes a maintenance station that is operable to align with the printheads and engage and/or support maintenance operations while the printheads are idle.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 shows a simplified cross-sectional view of an exemplary direct inkjet printing system in accordance with some embodiments of the present invention. According to some embodiments of the present invention, a direct inkjet printing system 100 includes an ink print head 102 and a support material printhead 104 that are stationary while printing. Optionally, support material printhead 104 is not required and/or is not included. In some exemplary embodiments, the system includes a maintenance station 106 that is operable to align under ink printhead 102 and/or under both ink print head 102 and a support material printhead 104 during idle times and to move and/or slide aside during printing procedures. According to some embodiments of the present invention, system 100 includes a building table and/or tray 108 that is movable in two direction, a printing and/or scanning direction, e.g. along an X axis and a vertical and/or layer building direction, e.g. along a Z axis. Alternatively, the building table is stationary in one or more directions and printheads 102 and 104 are operative to move in the scanning direction and/or in the cross scan direction.

According to some embodiments of the present invention, after a layer 50 is scanned, a building table 108 that supports the dispensed material is moved toward a drying station 116 and is inserted into drying station 116. Optionally, insertion is by pushing a spring loaded drying tray 114 of the drying station 116 open. Typically, drying station 116 includes air circulation and air heating devices as is described in detail herein.

Typically, building tray 108 is lowered in the layer building direction for each layer printed and dried so that a subsequent layer can be applied. Optionally, lowering occurs as the building table 108 is removed from drying station 116. Optionally, building tray 108 includes a rotating plate 110 that is operable to rotate a surface of building tray 108 by 90 degrees after a layer has been printed. Optionally, rotating plate 110 provides for building in a crisscross fashion as is described in more detail herein. According to some embodiments of the present invention, ink print head 102 and support material printhead 104 are mounted on a Y axis stage 112. Optionally, each of ink print head 102 and support material printhead 104 can be shifted and/or incremented in the Y direction, e.g. along Y axis stage 112 when printing different layers to avoid a ditch pattern forming on the layers.

According to some embodiments of the present invention, a pressure roller 118 is actuated once per several layers, e.g.

several tens of layers after drying in drying station 116. Typically, pressure roller 118 is stationary in the X axis direction but movable in the Z direction. Typically, building table 108 advances in X direction from drying station 116 toward roller 118 while roller 118 is lowered so that roller 118 engages a top surface of layer(s) 50. Typically, as building table 108 continues to advance in the scanning direction, ink print head 102 and support material printhead 104 proceed to apply an additional layer. Optionally, each of ink print head 102 and support material printhead 104 are operated consecutively, e.g. first ink print head 102 is operated to scans the layer and then support material printhead 104 is operated to scan the layer.

Typically, each of ink print head 102 and support material printhead 104 include an array of nozzles. In some exemplary embodiments, each layer is printed by alternatively scanning the layer with the odd nozzles of each of the printheads, drying the sub-layer and then repeating the printing and drying process with the even nozzles of each of the printheads. Alternatively, the even nozzles are used first and then followed by the odd nozzles. The present inventor has found that a typical printing/drying cycle may take around 2.5 sec. for a table size of 200 mm, so that a full layer can be printed in about 5 sec. Optionally, a typical building rate may be around 3.6 mm per hour. Optionally, the building rate may vary between 2 mm/hour to 5 mm/hour depending table size and/or other parameters.

Figure 2:
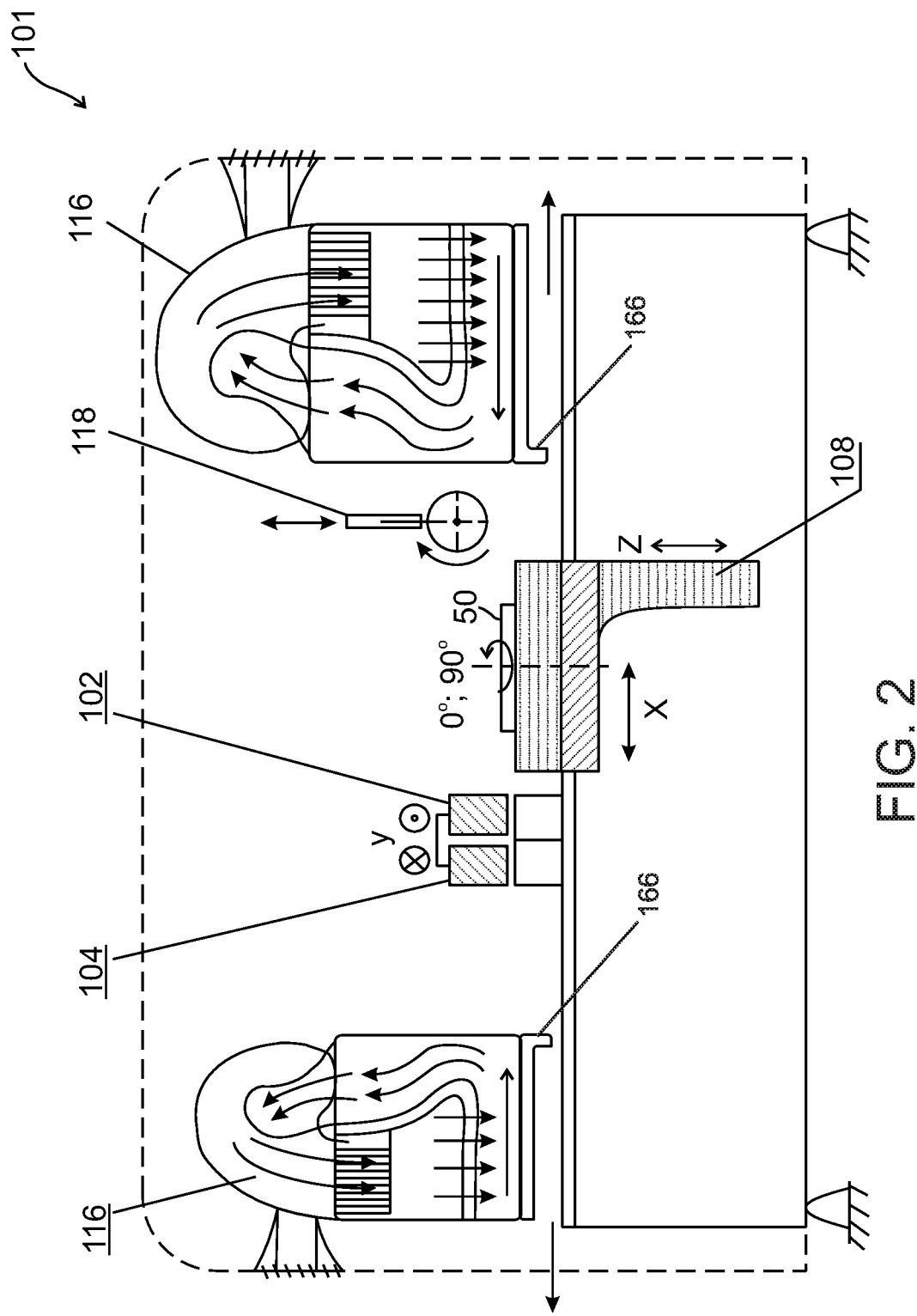
FIG. 2 is a simplified cross-sectional view of an exemplary direct inkjet printing system including two drying stations in accordance with some embodiments of the present invention.

Reference is now made to FIG. 2 showing a simplified cross-sectional view of an exemplary direct inkjet printing system including two drying stations in accordance with some embodiments of the present invention. According to some embodiments of the present invention, the building rate can be improved by including two drying stations 116 in printing system 101, a first drying station 116 on a right side of ink print head 102 and support material printhead 104 along the scanning direction and a second drying station 116 on a left side ink print head 102 and support material printhead 104 along the scanning direction. Optionally, building table 108 travels to the left as odd nozzles of ink print head 102 and support material printhead 104 are printing a first portion of layer 50. Optionally, when the first portion is completed, layer 50 with building table 108 is inserted into drying station 116 on the left. According to some embodiments of the present invention, after drying with the drying station 116 on the left, building tray 108 travels toward the right in the scanning direction as even nozzles of ink print head 102 and support material printhead 104 print a the second portion of layer 50. Optionally, when the second portion is completed, layer 50 with building table 108 is inserted into drying station 116 on the right. Typically, the layer is completed after the second portion is printed and dried. This process is typically repeated to print additional layers. It is noted that roller 118 is shown to be positioned between printing heads 102 and 104 and drying station 116 on the right, since the complete layer is ready when exiting drying station 116 on the right. Optionally, if the first portion of the layer is printed while building table 108 moves toward the right, roller 118 will be placed on the left. Alternatively, two rollers 118 may be used, one next to each of the drying stations. The present inventors have found that when using two drying stations 116 as described herein, a typical cycle for a table size of 200 mm may consume about 2.6 sec for a full layer. This represents a building rate of about 6.9 mm per hour.

Figure 3:
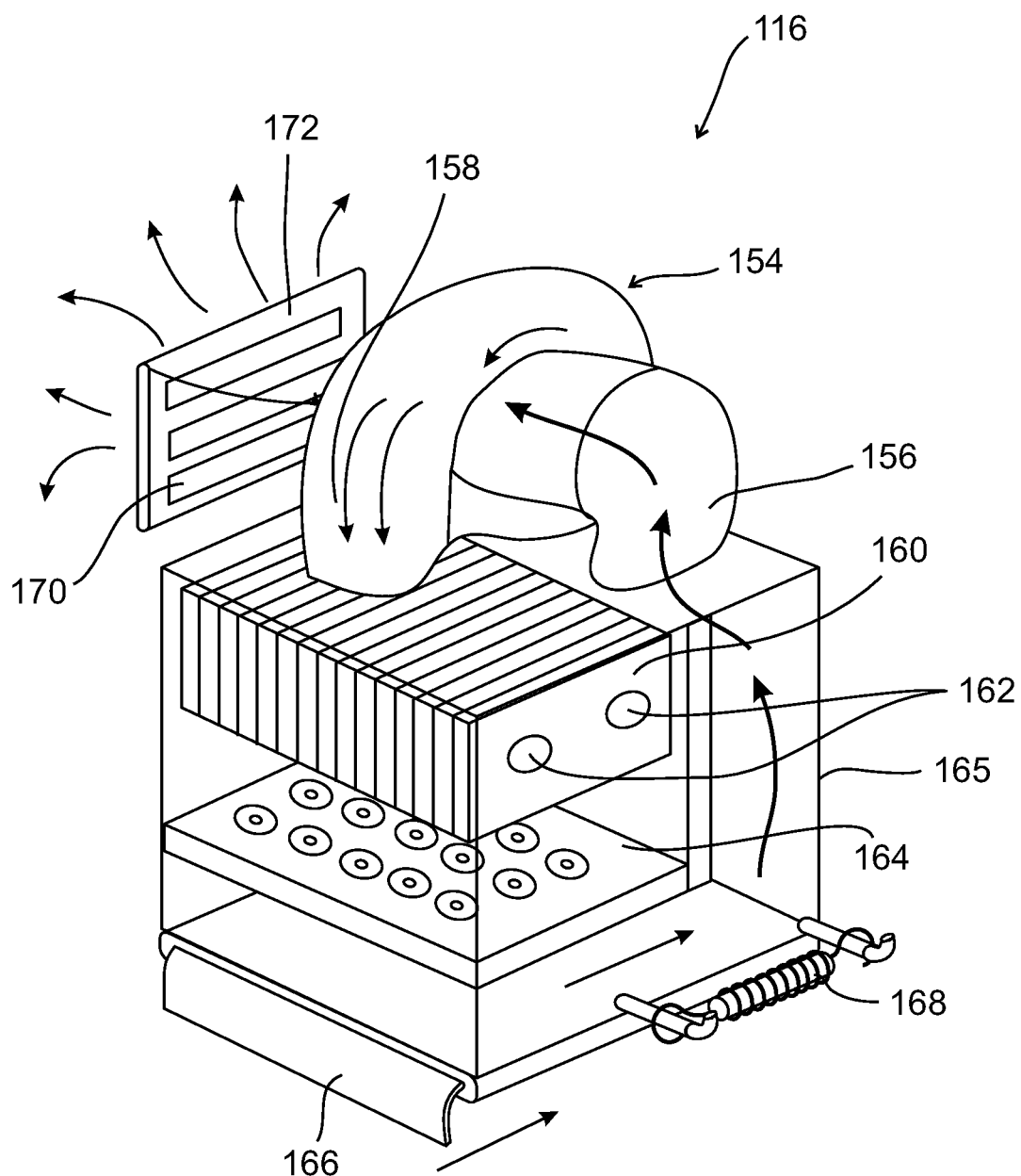
FIG. 3 is a simplified schematic drawing of an exemplary drying station in accordance with some embodiments of the present invention.

Reference is now made to FIG. 3 showing a simplified schematic drawing of an exemplary drying station in accordance with some embodiments of the present invention. According to some embodiments of the present invention, drying station 116 provides heat transfer to dry layers of the printed object by impinging jets of hot air onto the layers. According to some embodiments of the present invention, a blower 154 includes a blower inlet 156 for sucking hot air from a housing 165 of drying station 116 and a blower outlet 158 for blowing air into housing 165. Optionally, blower 154 is capable of air transfer at a temperature of around 220° C. as may typically be required for humectant evaporation. In some exemplary embodiments, hot air is substantially continuously circulated to reduce power consumption of drying station 116 and also to contain the solvent vapor that is formed within the drying station so that the vapor is not spread into the surrounding environment of the printing system, e.g. the room in which the printing system is stationed.

According to some embodiments of the present invention, air that is blown into housing 165 through blower outlet 158 passes through a fin based heat exchanger 160 which is electrically heated by heating elements 162. According to some embodiments of the present invention, hot air that leaves heat exchanger 160 is jetted in high speed through an air nozzle plate 164 toward building table 108 when positioned in drying station 116. Optionally, nozzle plate 164 is equipped with an array of round nozzles, e.g. round nozzle array and/or a slot array of nozzles.

According to some embodiments of the present invention, in the absence of the building table 108, sliding cover and/or door 166 is closed and hot air blowing out through nozzle plate 164 cyclically impinges sliding cover 166 and is then sucked back to blower inlet 156. According to some embodiments of the present invention, as building table 108 starts to push sliding cover 166 open, the blower speed and/or flow rate is increased. In addition, as sliding cover 166 is pushed open, fresh air penetrates into housing 165 which increases the internal pressure of housing 165. According to some embodiments of the present invention, the increase in pressure causes air to flow through blower output 158 and out of louvers 170 to an air spreader 172. Typically loaded louvers 170 are spring loaded and only open in response to pressure applied by air flowing out of blower output 158. According to some embodiments of the present invention, flow though louvers 170 releases a volume of humid air into the environment. Typically, the air replacement provides for maintaining a steady dew point inside drying station 116. In some exemplary embodiments, the volume of humid air is vented through a dedicated valve and/or tubing to a condenser to liquidize any accumulated vapors. In some exemplary embodiments, the air in the drying station is also periodically vented to avoid saturation of vapors accumulated in drying station due to the drying process of the dispensed ink. Typically, vented air is directed to a condenser to liquidize vapors so that the vapors are not expelled into the surrounding environment of the printing system.

According to some embodiments of the present invention, as building table 108 (FIG. 1) advances toward drying station 116 and pushes against sliding cover 166, sliding cover 166 slides open and building table 108 enters drying station 116. Typically, as building table 108 enters drying station 116 it begins to decelerate, then stops and accelerates in the opposite direction to exit from drying station 116. Typically, when building table 108 is situated in station 116, a pair of springs 168 positioned on opposite sides of sliding cover 166 slide cover 166 closed. In some exemplary embodiments, the estimated drying time required and/or period of time that building table 108 is positioned within drying station 116 is typically in the range of 0.5 sec to 1 sec, e.g. 0.7 sec.

According to some embodiments of the present invention, the layer that has been dried is maintained at a temperature between 50-70° C. after the building table 108 exits drying station 108. Typically, due to the elevated temperature of the layer, slight evaporation in a subsequent layer dispensed thereon is achieved. Optionally, the elevated temperature additionally provides for improving bonding with the subsequent layer. Typically the temperature of the layer depends on the heat capacity of the ink's particles. Optionally, external heat can be applied to maintain the elevated temperature of the printed layer while the subsequent layer is being dispensed.

Figure 4:
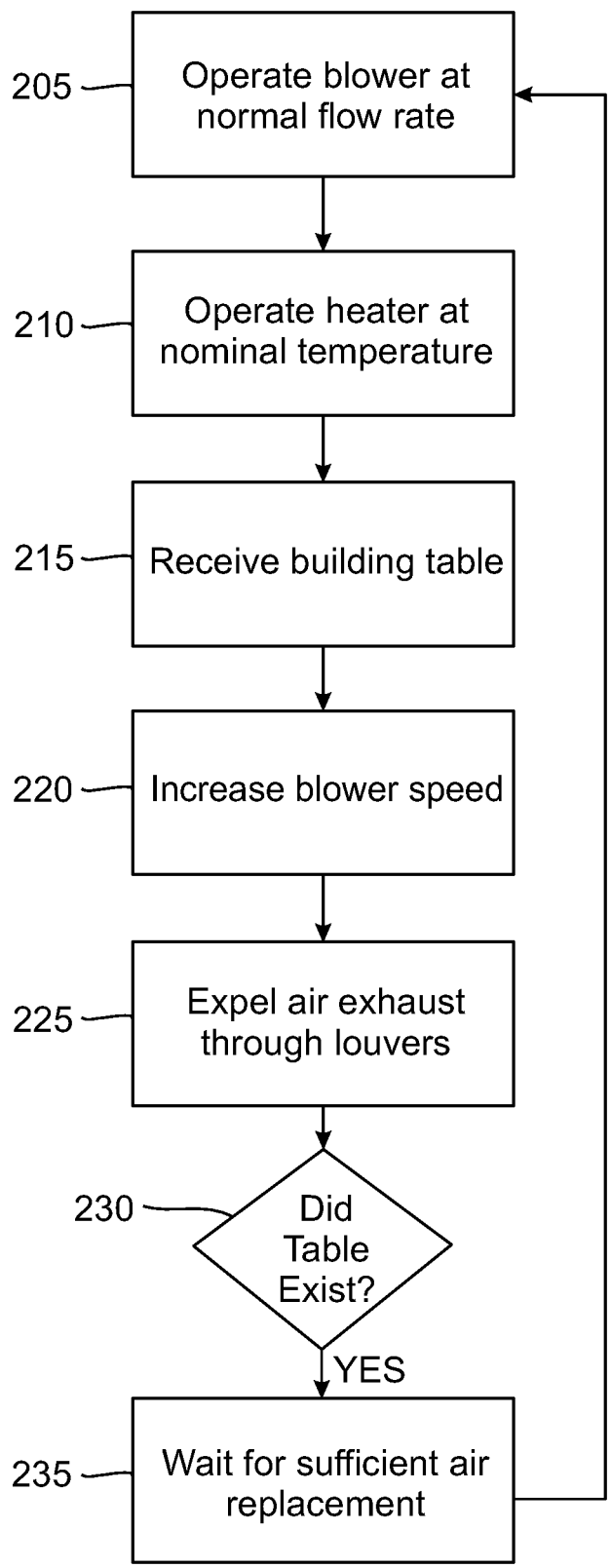
FIG. 4 is a simplified flow chart of an exemplary method for drying layers of printed material in accordance with some embodiments of the present invention.

Reference is now made to FIG. 4 showing a simplified flow chart of an exemplary method for drying layers of printed material in accordance with some embodiments of the present invention. According to some embodiments of the present invention, over a duration in which building table is outside of drying station 116, a flow rate of blower 154 is maintained at a nominal rate (block 205) and heater 160 is maintained at a nominal temperature (block 210). According to some embodiments of the present invention, as building table 108 is received (block 215) blower 154 accelerates its flow rate (block 220) and fresh air is received. According to some embodiments of the present invention, in response to the increase in pressure due to accelerated flow rate and the incoming fresh air, air exhaust is expelled through louvers 170 (block 225). According to some embodiments of the present invention, blower 154 continues to operate at high speed over the duration that building table 108 is inside drying station 116. According to some embodiments of the present invention, once building table 108 exits drying station 116 (block 230), the drying station waits to receive sufficient air replacement (block 235) and then reduces the flow rate of the blower to a nominal speed (205). Optionally, the heater is maintained at constant temperature as long as the drying station is operating.

Figure 5:
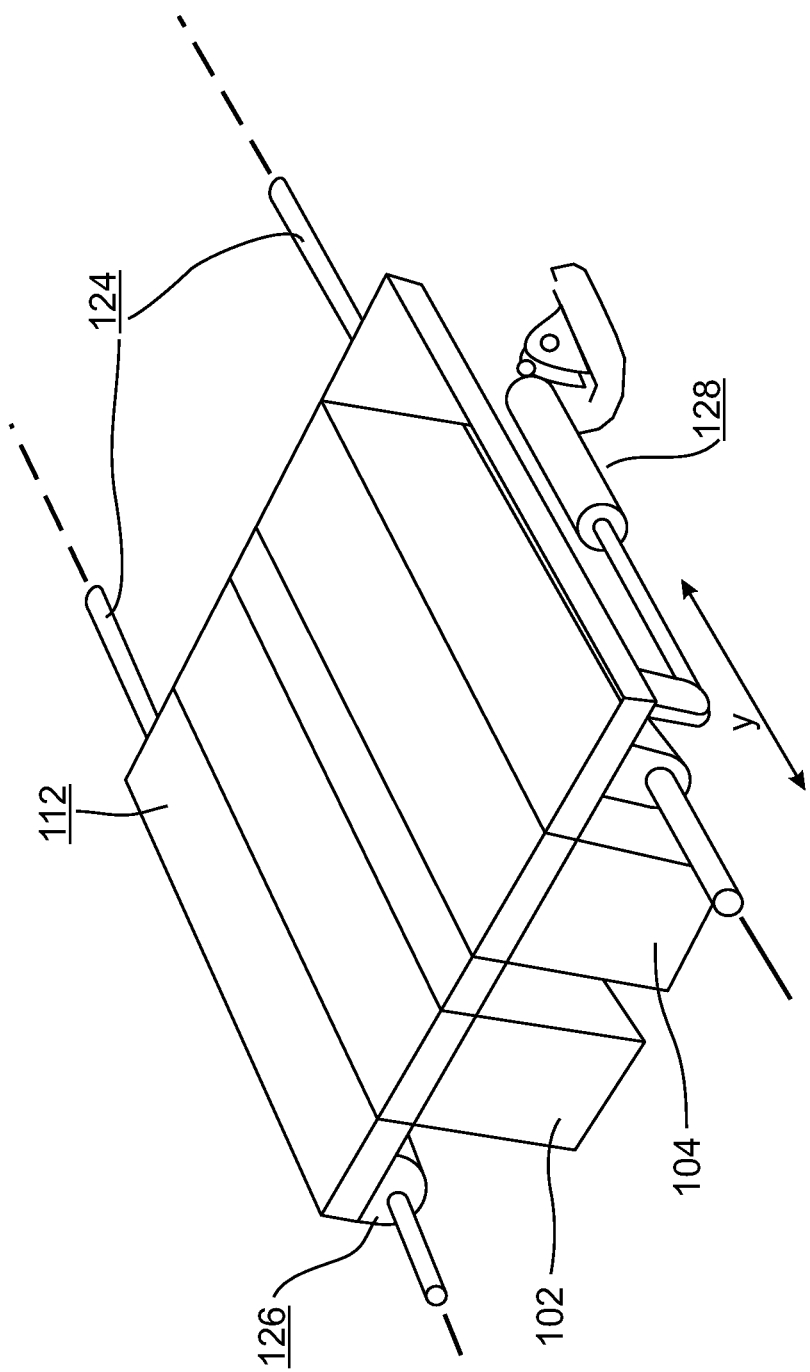
FIG. 5 is a simplified schematic drawing of an exemplary Y axis stage for supporting the printheads in accordance with some embodiments of the present invention.

Reference is now made to FIG. 5 showing a simplified schematic drawing of an exemplary Y axis stage for supporting the printheads in accordance with some embodiments of the present invention. According to some embodiments of the present invention, printheads 102 and 104 are mounted on Y axis stage 112 that provides for shifting printheads 102 and 104 between a half pixel position and a full pixel position. For example, for a printing resolution of 260 dots per inch, Y axis stage 112 provides for shifting the printheads by 35 micrometers intervals. Optionally, Y axis stage 112 may provide for shifting of printheads 102 to more than two positions per pixel. According to some embodiments of the present invention, Y axis stage 112 includes rails 124, linear bearings 126 and actuator 128. According to some embodiments of the present invention, Y axis stage 112 operates to shift position of printheads 102 and 104 back and forth by a half a pixel distance for each subsequent layer printed. In some exemplary embodiments, operation of Y axis stage 112 provides for smoothing out ditches that typically form along the print lines. Optionally, operation of Y axis stage 112 provides a tradeoff between number of printing nozzles (price) and the model building rate (throughput). Optionally, when number of nozzles per printhead is reduced by half, a first half of the layer is printed by using all the nozzles, after which the printheads are shifted by a half a pixel distance and the second half of the layer is printed by using all the nozzles. As such, a same pixel density may be achieved with half the number of nozzles.

Figure 6:
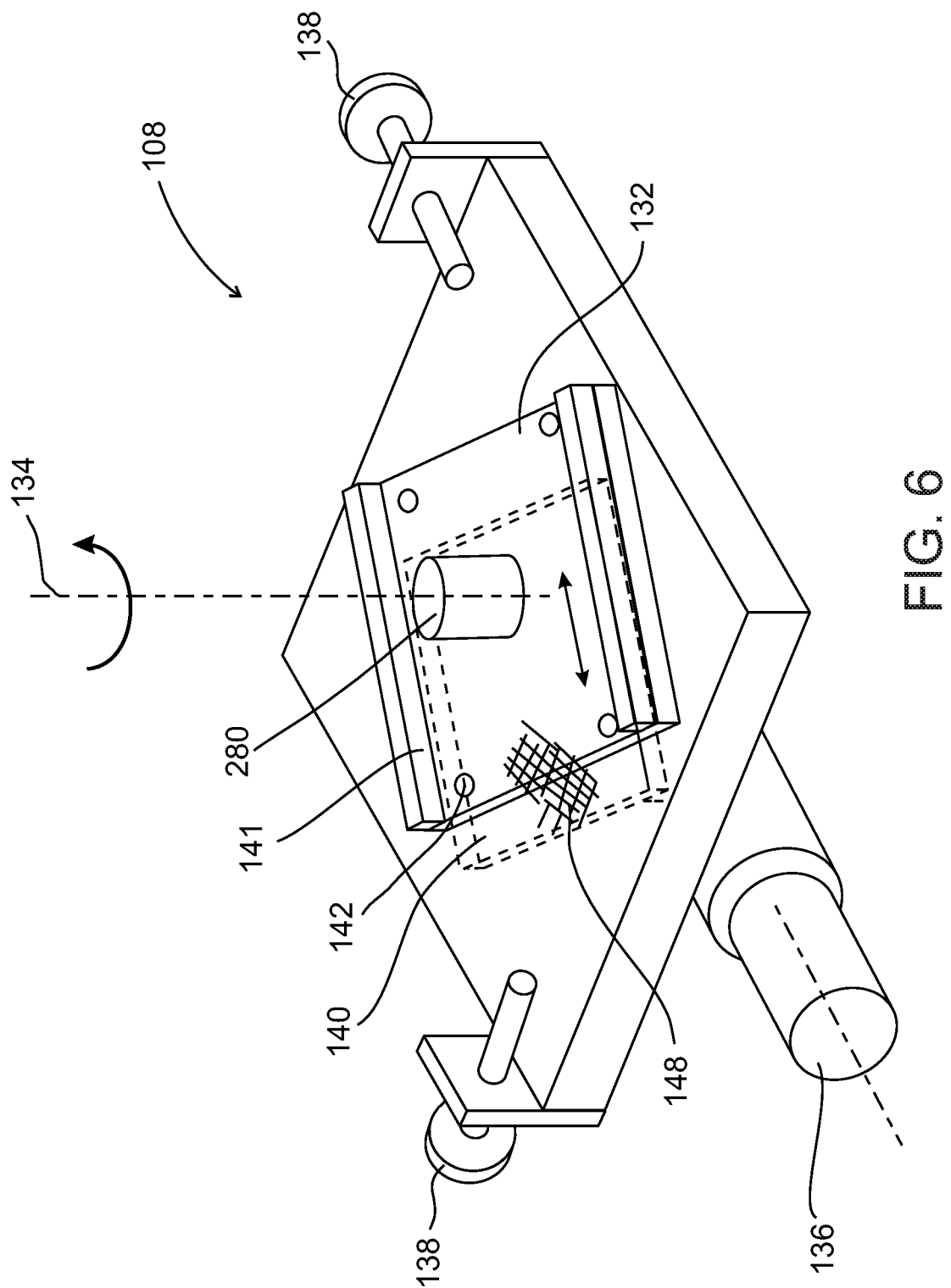
FIG. 6 is a simplified schematic drawing of an exemplary rotatable building tray in accordance with some embodiments of the present invention.

Reference is now made to FIG. 6 showing a simplified schematic drawing of an exemplary rotatable building tray in accordance with some embodiments of the present invention. According to some embodiments of the present invention, a table platform 132 is operable to rotate at 90 degree intervals about a central axis 134 by a gear motor 136. According to some embodiments of the present invention, building table 108 and/or table platform 132 include one or more stoppers 138 such that provide for aligning edges of table platform 132. Optionally, differential screws are used to obtain high accuracy in aligning the edges. According to some embodiments of the present invention, table platform 132 includes a tray 140 on which an object 280 is built. Typically, tray 140 is operable to be pulled out and transferred with object 280 to a sintering oven. Typically, tray 140 is made from a ceramic material or other material that is suitable for placing in a sintering oven. In some exemplary embodiments, tray 140 is positioned on table platform 132 using slides 141. In some exemplary embodiments, a plurality of spring loaded balls 142, e.g. four balls are positioned on table platform 132 and near edges of tray 140 and push tray 140 upwards so as to prevent any relative motion of tray 140 during movement of building table 108 and/or rotation of table platform 132. Optionally, balls 142 are rotatable. Typically, the balls are made from ceramic material.

According to some embodiments of the present invention, tray 140 is covered with a mat 148 that is used as a primary hydrophilic surface for absorbing water and/or solvent from the dispensed ink so that the powder, particles and/or polymer is stabilized on mat 148 so that coalescence of the droplets can be avoided. Typically, mat 148 is selected to provide a surface tension higher than a surface tension of the ink. Optionally, mat 148 is inkjet paper and/or a layer coated with receptive coating, e.g. PVP. Optionally, mat 148 is separated from object 280 prior to sintering. Optionally, mat 148 burns in temperatures of about 235° C.

Figure 7:
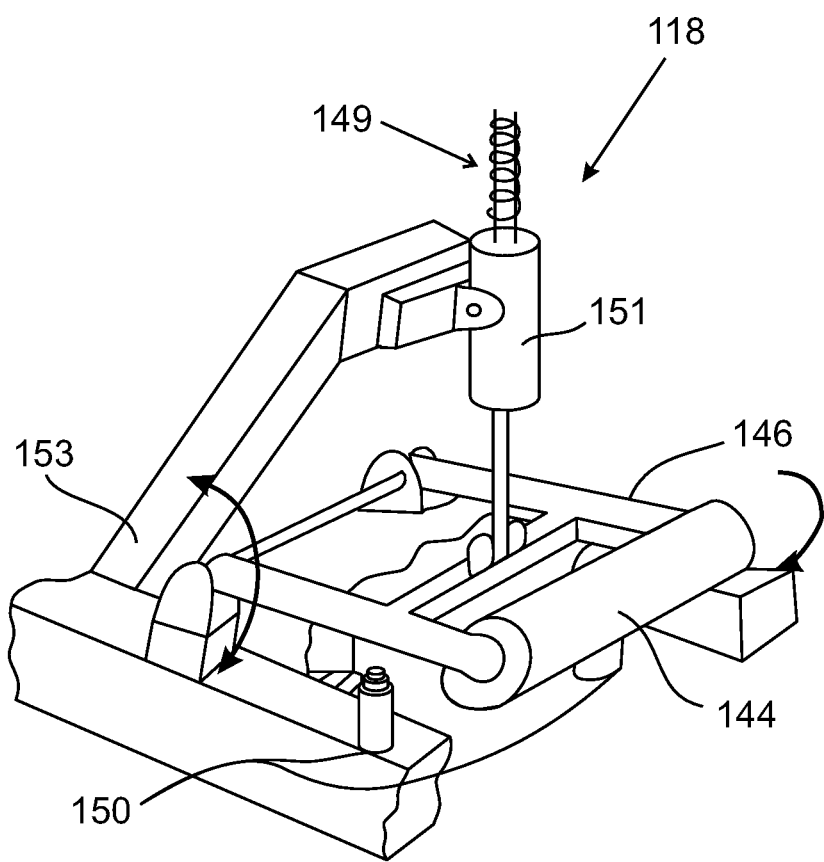
FIG. 7 is a simplified schematic drawing of an exemplary roller for flattening printed layers in accordance with some embodiments of the present invention.

Reference is now made to FIG. 7 showing a simplified schematic drawing of an exemplary roller for flattening printed layers in accordance with some embodiments of the present invention. In some exemplary embodiments, roller unit 118 is fixed on building table 108 and connected to frame 153 but includes a roller 144 that is connected to a swing mechanism 146 so that roller 144 can be pulled up by solenoid 151 and spring 149 while not in use. Typically, roller 144 is mounted on building table 108 and extends over a width of tray 140. Typically, roller 144 is lowered for flattening printed layers and is operated by passing the printed layer below roller 144. In some exemplary embodiments, while roller 144 is in use, two pre-aligned stoppers 150 mounted on building table 108 support arms of swing mechanism 146 and maintain roller 144 at a defined height above tray 140 (FIG. 6). Optionally, roller 144 is operative to provide a relative large force while avoiding nipping of the roller and/or surface responsive the relative high speed of table while passing below roller 144. Optionally, roller 144 provides a force of 50-300 N, e.g. 200 N for flattening printed layers of an object positioned on a 200 mm building table 108. Typically, the linear table speed is between 100 to 1000 mm/sec.

Figure 8A:
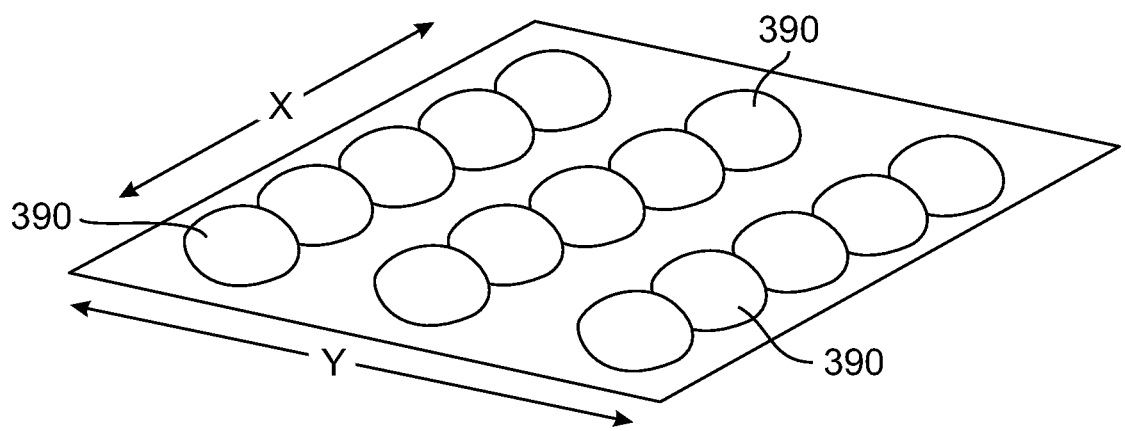
FIGS. 8A and 8B are simplified schematic drawings of ink droplets dispensed from odd nozzles of a printhead shown in a perspective and front view respectively and in accordance with some embodiments of the present invention.
Figure 8B:
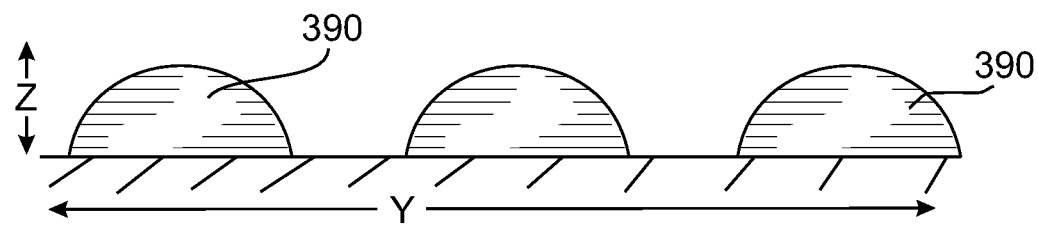
Figure 9:
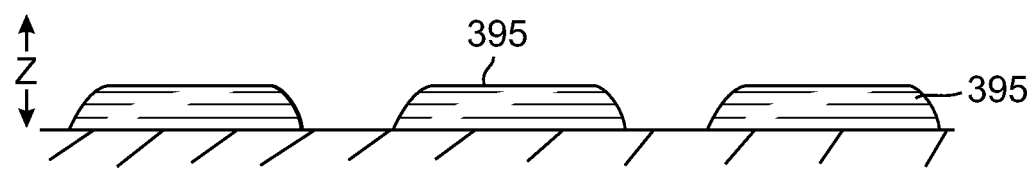
FIG. 9 is a simplified schematic drawing of the ink droplets dispensed from odd nozzles of a printhead after a drying process, shown in a front view and in accordance with some embodiments of the present invention.

Reference is now made to FIGS. 8A and 8B showing simplified schematic drawings of ink droplets dispensed from odd nozzles of a printhead and/or with one pixel gaps shown in a perspective and front view respectively and FIG. 9 showing the ink droplets dispensed from odd nozzles after a drying process, shown in a front view, all in accordance with some embodiments of the present invention. According to some embodiments of the present invention, printing heads 102 and 104 are operative to dispense lines of contiguous droplets of ink 390 in successive manner along a printing direction, e.g. along a direction of an X axis, e.g. with a pixel separation between the droplets and to dispense droplets 390 in cross printing direction, e.g. along a direction of a Y axis with a one pixel gap between droplets 390 and/or a two pixel separation between droplets 390. In some exemplary embodiments, the one pixel gap between droplets 390 is provided by printing with either odd nozzles or even nozzles. Alternatively, the one pixel gap is provided by printing with lower density array of nozzles. According to some embodiments of the present invention, when printheads are operative to print with one pixel gap between droplets 390, a layer is completed in a two step process including a first step of scanning with a one pixel gap in the cross scan direction and then scanning again to fill in the gaps in the cross scan direction.

Typically, size of droplets 390 is selected based on a desired thickness of a printed layer. In some exemplary embodiments, when a 5 micrometer layer is desired, droplets with a volume of 80 pico-liter and a 53 micrometer diameter may be used. Typically, size of the droplet 390 on the building surface, e.g. tray 140 after drop landing may be around 85 micrometer, presenting a dot ratio (the ratio between the dot and the drop diameters) of around 1.6. Optionally, the height of the droplet will be around 14 micrometer. The present inventor has found that droplets 390 typically keep their surface dimensions, e.g. diameter in X-Y plane due to the surface wetting and a loss of the volume due to drying mainly influences the dimensions in the vertical axis, e.g. Z axis. Typically, after the drying process 60% to 80% of the volume may be evaporated due to water, humectant or solvent evaporation and a height of a dried droplet 395 may be reduced by 3 to 5.7 micrometer, due to wetting and drying in drying station 116.

Figure 10A:
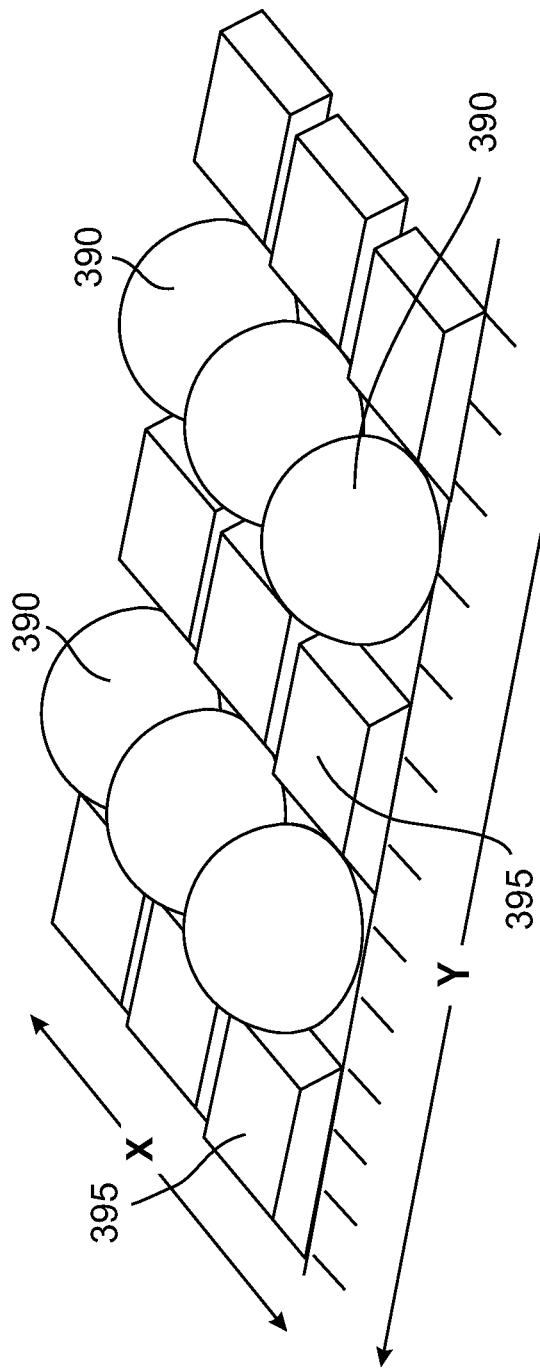
FIGS. 10A and 10B are simplified schematic drawings of additional ink droplets subsequently dispensed from even nozzles of a printhead shown in a perspective and front view respectively and in accordance with some embodiments of the present invention.
Figure 10B:
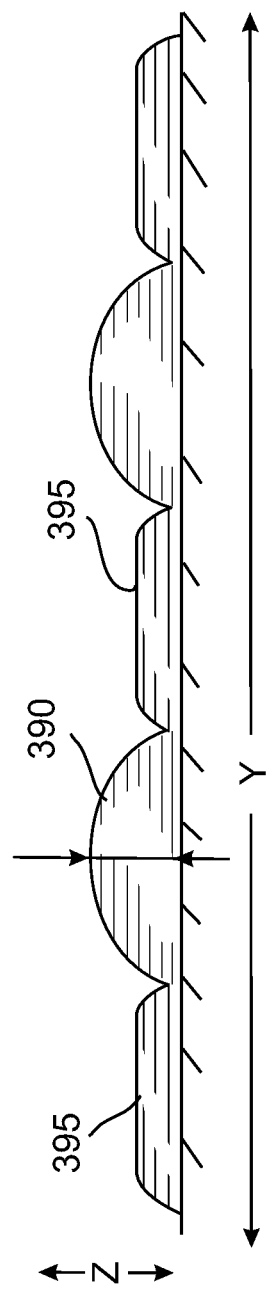

Reference is now made to FIGS. 10A and 10B are simplified schematic drawings of additional ink droplets subsequently dispensed from even nozzles of a printhead and/or with one pixel gaps shown in a perspective and front view respectively and in accordance with some embodiments of the present invention. The present inventor has found that coalescence requirements between adjacent or close droplets should be considered to avoid pattern distortion and/or loss of detail in the object being printed. The present inventor has also found that there is a difference in the coalescence behavior of droplets dispensed in a successive manner from a same nozzle to generate a line in a printing direction, e.g. along a direction of an X axis and that of droplets dispensed in successive passes of the printing heads in cross printing direction, e.g. along a direction of a Y axis.

The present inventor has found that while the relatively short interval time between successive dispensing of droplets in the printing direction results in stabilized droplets, the relatively long interval times between successive passes of the printheads in the cross print direction can lead to distortion at the seams between a line of droplets printed in a previous pass and a new line of droplets. For example, a scan rate of about 10 KHz results in an interval period of about 100 microseconds between successive droplets in the printing direction, which is typically sufficient for stabilizing successive droplets. Considering this time frame, a new droplet is typically dispensed before a present droplet coalesces with a previously dispensed droplet and the presence of the new droplet bounds the mobility of the current droplet. On the other hand, for different passes of the printing head, the time interval between dispensing contiguous droplets can be several milliseconds. In this case, the first set of droplets may be fixed to their position due to the partial drying and the next contiguous set of droplets dispensed along a border of the previous pass may coalesce with the first set of droplets. If the first set of droplets only appears on one side of the next contiguous set, droplets along a border between passes will move toward the fixed droplets and cause distortion. According to some embodiments of the present invention, distortion is avoided by printing the layers in a two step process. According to some embodiments of the present invention, during a first step a first set of droplets are dispensed with a pixel gap between the droplets in the cross scan direction and dried to produce dried droplets 395. According to some embodiments of the present invention, during a subsequent step, a second set of droplets 390 are printed within the one pixel gaps established during the first step. The present inventors have found that by printing the second set of droplets between two dried droplets 395, the coalescence behavior of droplets 390 is maintained symmetrical and the distortion is avoided. According to some embodiments of the present invention, the completed layer including both the first and second sets of droplets is dried in the drying station before an additional layer is printed. According to some embodiment of the present invention, the layer is heated to 50-70° C. during the drying process. In some exemplary embodiments, heating of the layer is applied to initiate a sufficient amount of evaporation and thereby reduce mobility of droplets before the layer undergoes a drying process, e.g. in drying station 116. The present inventor has found that heating a layer to 50-70° C. reduces mobility of droplets in a successive layer without causing an adverse effect of significant condensation on the nozzle plate of the printheads 102 and 104. Optionally, an ambient temperature of the printing apparatus is also heated to avoid destabilization of the droplets.

Reference is now made to FIGS. 11A and 11B showing simplified schematic drawings of an exemplary complete printed layer after a drying process, shown in a perspective and front view respectively and in accordance with some embodiments of the present invention. According to some embodiments of the present invention, ditches and/or valleys 205 may form in a layer 210 between print lines in the printing direction, e.g. X axis direction. Optionally, for a 5 micrometer layer, a ditch with a depth of 1.5-2 micrometer may form. Typically, when printing a successive layer, similar ditches will occur and will be aligned with ditches of the current layer. In addition, due to the non-uniformity of the surface of the present layer, a subsequent layer may not completely fill ditches in a current layer. The present inventor has found that this irregularity in the building process can cause dimensional instability, dimensional inaccuracy in Z axis and can also reduce mechanical strength of the resulting object.

Figure 12:
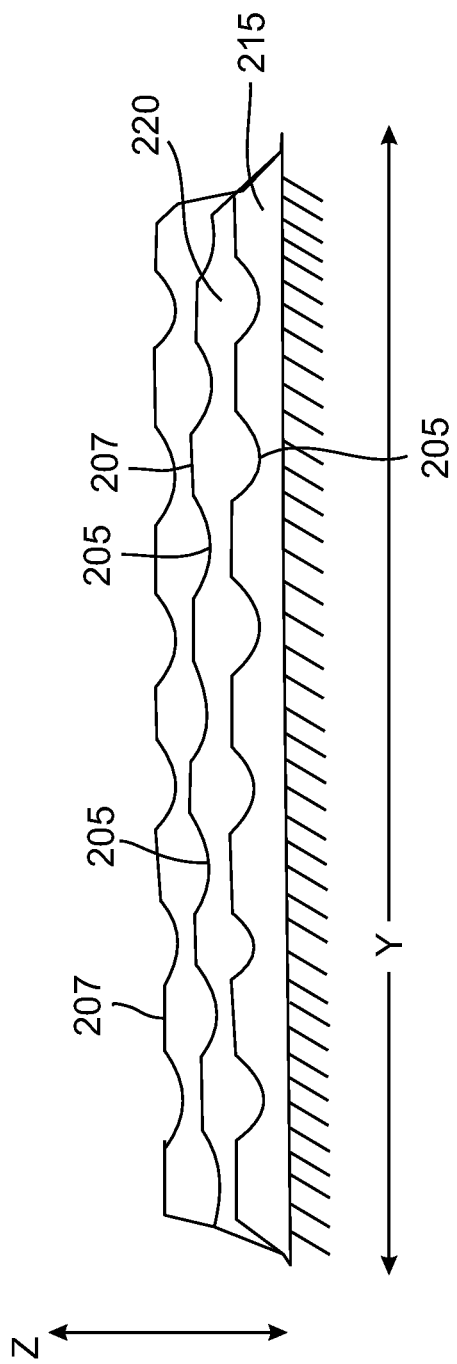
FIG. 12 is a simplified schematic drawing showing a plurality of exemplary printed layers responsive to applying lateral shifting of the printhead in accordance with some embodiments of the present invention.

Reference is now made to FIG. 12 showing a simplified schematic drawing of a plurality of exemplary printed layers responsive to applying lateral shifting of the printhead in accordance with some embodiments of the present invention. According to some embodiments of the present invention, the printheads 102 and 104 are shifted back and forth by a half a pixel distance in the cross printing direction to reduce the effect of ditch formation in the cross printing direction. Optionally, in a second layer 220, ditches 205 are formed between ditches 205 formed in a first layer 215. Shallower ditches 207 in a second layer for example may also formed directly above ditches 205 in the first layer. Typically, ditches 205 and 207 are less pronounced in layer 220 and subsequent even layers since these layers provide for filling ditches 205 of the previous layer and are therefore slightly thinner. In some exemplary embodiments, a half pixel shift may cause distortion at the edge of the layer which may make the effected edge of the printed object coarse and/or rough.

Figure 13:
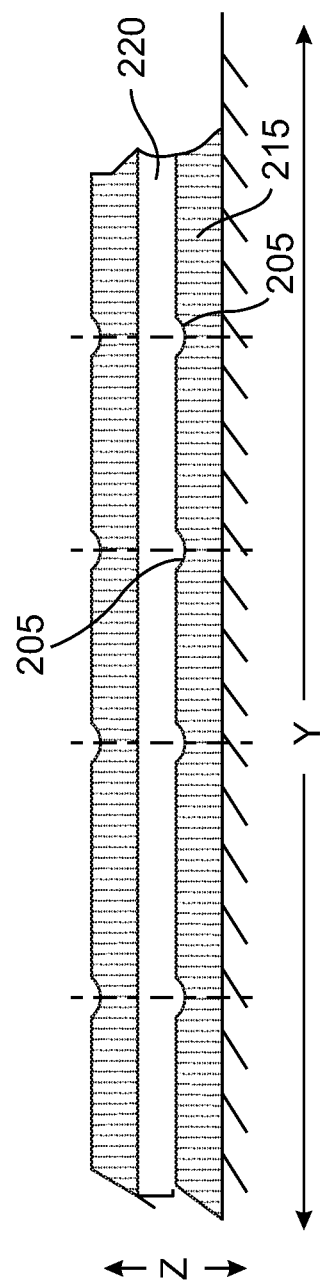
FIG. 13 is a simplified schematic drawing showing a plurality of exemplary printed layers responsive to applying rotation of the building platform in accordance with some embodiments of the present invention.

Reference is now made to FIG. 13 showing a simplified schematic drawing of a plurality of exemplary printed layers responsive to applying rotation of the building platform in accordance with some embodiments of the present invention. According to some embodiments of the present invention, an accumulated ditch effect is avoided and/or reduced by rotating the building platform in the X-Y plane by 90 degrees prior to printing a subsequent layer. Optionally, rotation is applied after a plurality of layers has been printed. According to some embodiments of the present invention, rotation breaks the accumulated ditch pattern and reduces the adverse effects along the Z axis, e.g. adverse effect on the mechanical properties of the printed object. Typically, rotation of the building platform by 90 degrees has the advantage that it does not lead to coarse edges as discussed in reference to FIG. 12.

According to some embodiments of the present invention, if a nominal layer thickness of about 5.1 micrometer is obtained, after printing for example 50 layers, roller 144 is applied to compress height of the layers to 250 micrometer (average of 2% compression) to reduce accumulated height error. Optionally a compression of about 2% is applied. The present inventor has found that the compression due to rolling may enhance bonding of the powder particles. In the case of soluble polymer ink, the present inventor has found that compression due to rolling may support better layer adhesion. Optionally, for polymer ink, a lower compression during rolling is desired, e.g. 1% compression. Optionally, printing density used is 320 to 360 dpi for a full layer.

Figure 14:
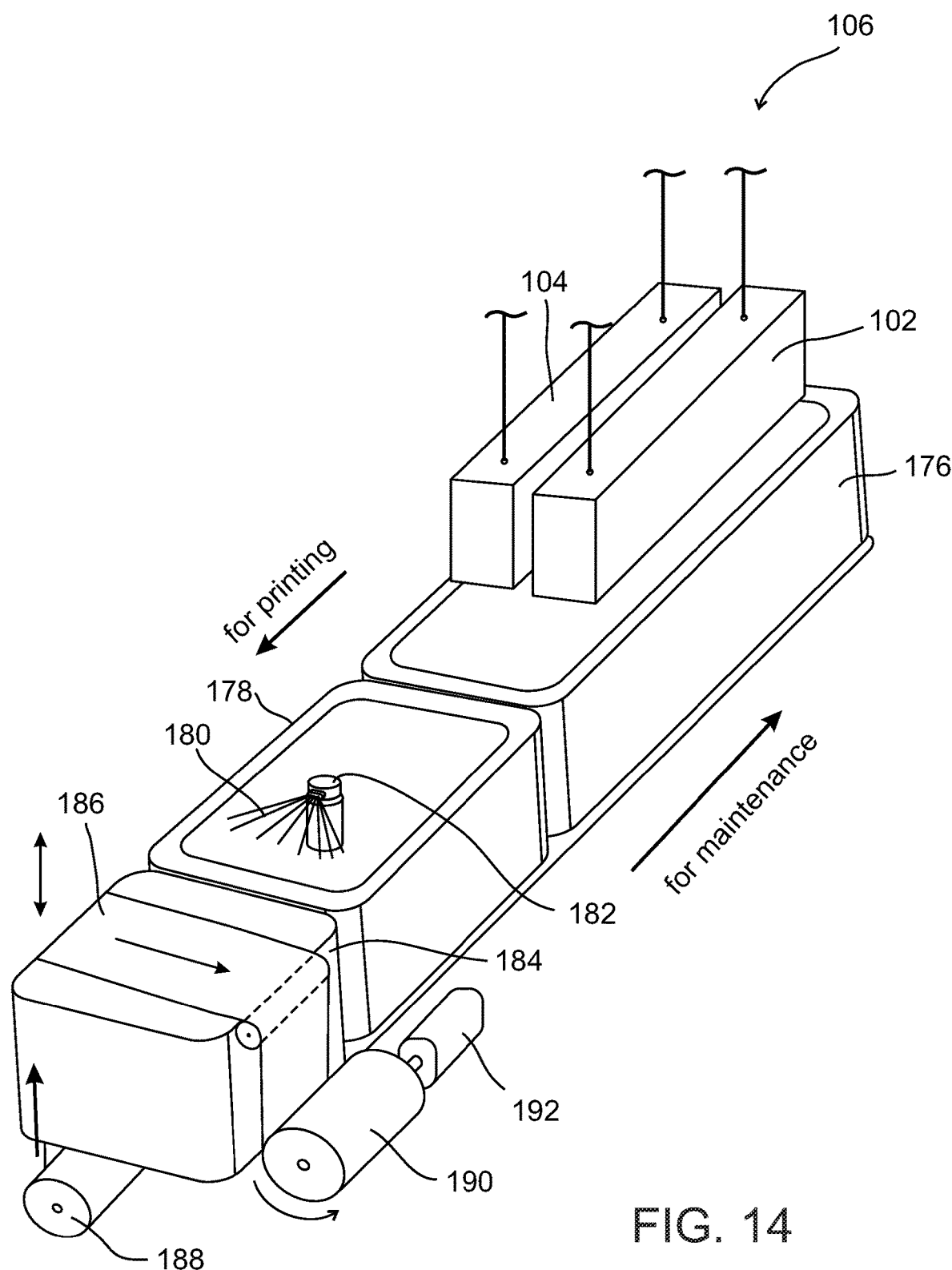
FIG. 14 is a simplified schematic drawing of an exemplary maintenance station in accordance with some embodiments of the present invention.

Reference is now made to FIG. 14 showing a simplified schematic drawing of an exemplary maintenance station in accordance with some embodiments of the present invention. According to some embodiments of the present invention, a maintenance station 106 is positioned under print heads 102 and 104 during idle periods of system 100. According to some embodiments of the present invention, during idle periods of system 100, positioning of maintenance station 106 is controlled to align with one of a plurality of sub-stations of maintenance station 106. In some exemplary embodiments, a first substation is a spitting tray 176 that is operable to collect ink that is dispensed during a drop spitting procedure and/or a printhead purging procedure of the printhead(s). Typically, the drop spitting procedure is required for slow-ink circulation through the nozzle of the printhead to avoid nozzle drying, crusting and clogging. In some exemplary embodiments, printhead purging is initiated after long idle periods. Typically during a printhead purging procedure, ink is pushed out through nozzles of the printing head at high pressure to open nozzles that may be blocked.

In some exemplary embodiments, a second sub-station 178 is a misting station. According to some embodiments of the present invention, during a misting procedure, a fine mist 180 of cleaning fluid, e.g. water and detergents in case of water based ink, or solvent in case of solvent base ink is sprayed onto the nozzle plate of the printhead with a spraying nozzle 182. Optionally, the nozzle plate is coated with hydrophobic coating. Typically, the misting procedure is applied after a drop spitting procedure and/or a printhead purging procedure while the nozzle plate is wet from the dispensed ink.

In some exemplary embodiments, a third sub-station 184 is a blotting and capping station. In some exemplary embodiments, this sub-station extends toward the printing heads and engages blotting paper 186 to the nozzle plate. Optionally blotting paper is firmly attached to the nozzle plate and collects residual fluid on the nozzle plate for cleaning the nozzle plate. Optionally, the nozzle plate is capped with blotting paper during long idle periods in which the ink is not removed from the system. Optionally, blotting paper is replaced and/or replenished by rolling paper incrementally from the supply roll 188 to the collecting roll 190 by the gear-motor 192.

Figure 15:
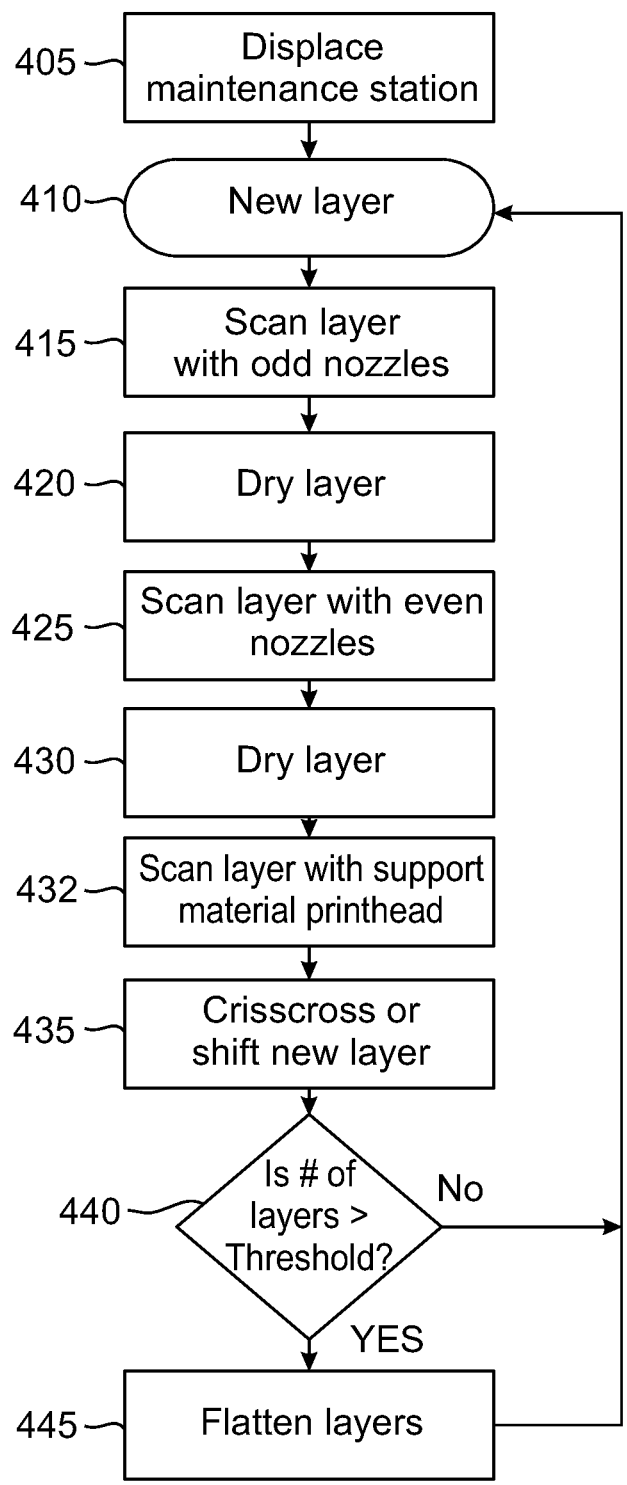
FIG. 15 is a simplified flow chart of an exemplary method for printing a 3D object in accordance with some embodiments of the present invention.

Reference is now made to FIG. 15 showing a simplified flow chart of an exemplary method for printing a 3D object in accordance with some embodiments of the present invention. According to some embodiments of the present invention, a printing procedure is activated after displacing the maintenance station 106 from the scanning area of the building table (block 405). According to some embodiments of the present invention, a new layer is printed (block 410) by first scanning the layer with odd nozzles of ink print head 102 (block 415). Alternatively, the layer is scanned with a printhead including a sparse set of nozzles, e.g. nozzle set reduced nozzle density that provide the one pixel gap and all the nozzles are used. Optionally, more than one printhead is used for printing and the printheads are operated in a consecutive manner. Optionally, the layer, e.g. the incomplete layer is dried (block 420). Typically, drying is applied to dry water, humectants and/or solvents in the printing layer and/or also to activate a binder if present in the ink. According to some embodiments of the present invention, the same layer is scanned again with even nozzles (block 425). Optionally, scanning with even nozzles is performed in the opposite direction to the scanning with the odd nozzles. Alternatively, the printhead(s) is shifted laterally by a pixel length and gaps formed by missing pixels in the previous scanning are filled. Typically, drying is applied again to dry the remaining part of the layer (block 430). According to some embodiments of the present invention, support material printhead 104 scans the layer after the ink material has been dispensed and dried (block 432).

In some exemplary embodiments, before printing a subsequent layer, the present layer is either rotated by 90 degrees and/or the printhead(s) are shifted by a half a pixel distance to avoid the ditch pattern (block 435). If a threshold number of layers have not been completed, a new layer is applied (block 440). Alternatively, when the threshold number of layers has been reached, the layers are flattened with roller 144 prior to adding the next layer (block 445). Typically, when building with ceramic and/or metal ink, the object is sintered as a final stage after all the layers have been applied.

Sintering and Final Product

According to some embodiments of the present invention, as a final step, an object that has been fabricated by the printing process with ceramic and/or metal ink is inserted into a sintering chamber. The present inventor has found that the contribution of the binder to the shrinkage of the model, due to its burning during the sintering process is $\sqrt[3]{(7\%)}$ or 1.9% or less. The present inventor has found that the relatively low concentration of the binder in the ink as described herein below in more detail allows "particle to particle" engagement even while the binder is present. The present inventor has also found that even though there is little external pressure while building during occasional flattening with the roller, the porosity resulting from binder removal is minimal and may have little or no negligible effect on the mechanical properties of the final object.

Ink Circulation System

Figure 16:
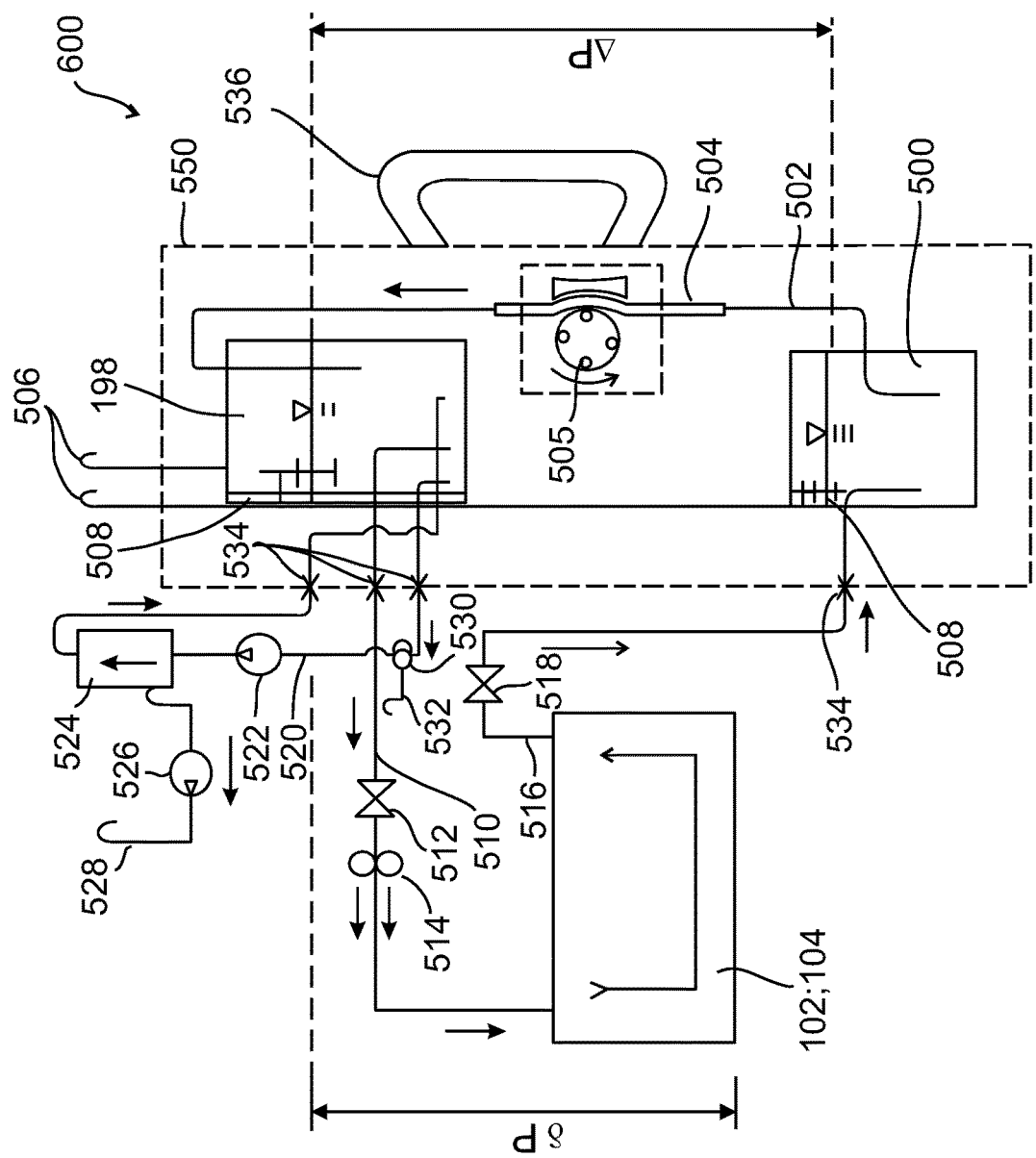
FIG. 16 is a simplified schematic diagram of an ink circulation unit with replaceable ink cassette in accordance with some embodiments of the present invention.

Reference is now made to FIG. 16 showing a simplified schematic diagram of an ink circulation unit with replaceable ink cassette in accordance with some embodiments of the present invention. According to some embodiments of the present invention, the ink circulation in the printheads 102 and 104 can reach flow of 50 cc/min. The present inventor has found that this flow rate can be served by gravitational controlled ink delivery as described herein. According to some embodiments of the present invention, ink delivery system 600 includes two ink tanks, an upper tank 198 and lower tank 500. Typically, both tanks are connected by a delivery line 502 that includes at least a tube 504 that is connected to a peristaltic pump 505. Typically, both tanks are ventilated by air ports 506 and the level is controlled by two float sets 508. According to some embodiments of the present invention, the ink circulation rate when assuming constant viscosity and surface tension values is defined by the total pressure difference $\Delta P$ between the upper tank 198 and lower tank 500 and the local pressure difference $\delta p$ between the upper print head and the printhead 102 or 104. Typically, the total and local pressure differences are constant for a specified cartridge design. Typically, upper tank 198 and lower tank 500 together with delivery line 502 and peristaltic pump 505 are housed in a replaceable cartridge 550. Typically, cartridge 550 is fluidly connected to printhead 102 or 104 via a plurality of quick connections 534 that can be engaged and/or detached with a handle 536 of cartridge 550.

According to some embodiments of the present invention, a feed line 510 travels from upper tank 198 via an inlet valve 512, through a purging device 514, to printhead 102 or 104. The purging device is described in detail herein for example in reference to FIG. 18. According to some embodiments of the present invention, a return line 516 leaves printhead 102 or 104 via an outlet valve 518 to lower tank 500. According to some embodiments of the present invention, ink is transferred by a pump 522 from upper tank 198, through a porous "lung" 524 and back to upper tank 198. In some exemplary embodiments, dissolved air is removed by a vacuum pump 526 and released through a vent 528.

According to some embodiments of the present invention, during cartridge replacement, this line passing through porous "lung" 524 can be drained by changing ports of the universal 3/2 valve 530 from an "ink to ink" state to "air to ink" state using a ventilation line 532. Typically during "air to ink" state, pump 522 sucks air (instead of ink) and pushes the ink back to upper tank 198.

Figure 17:
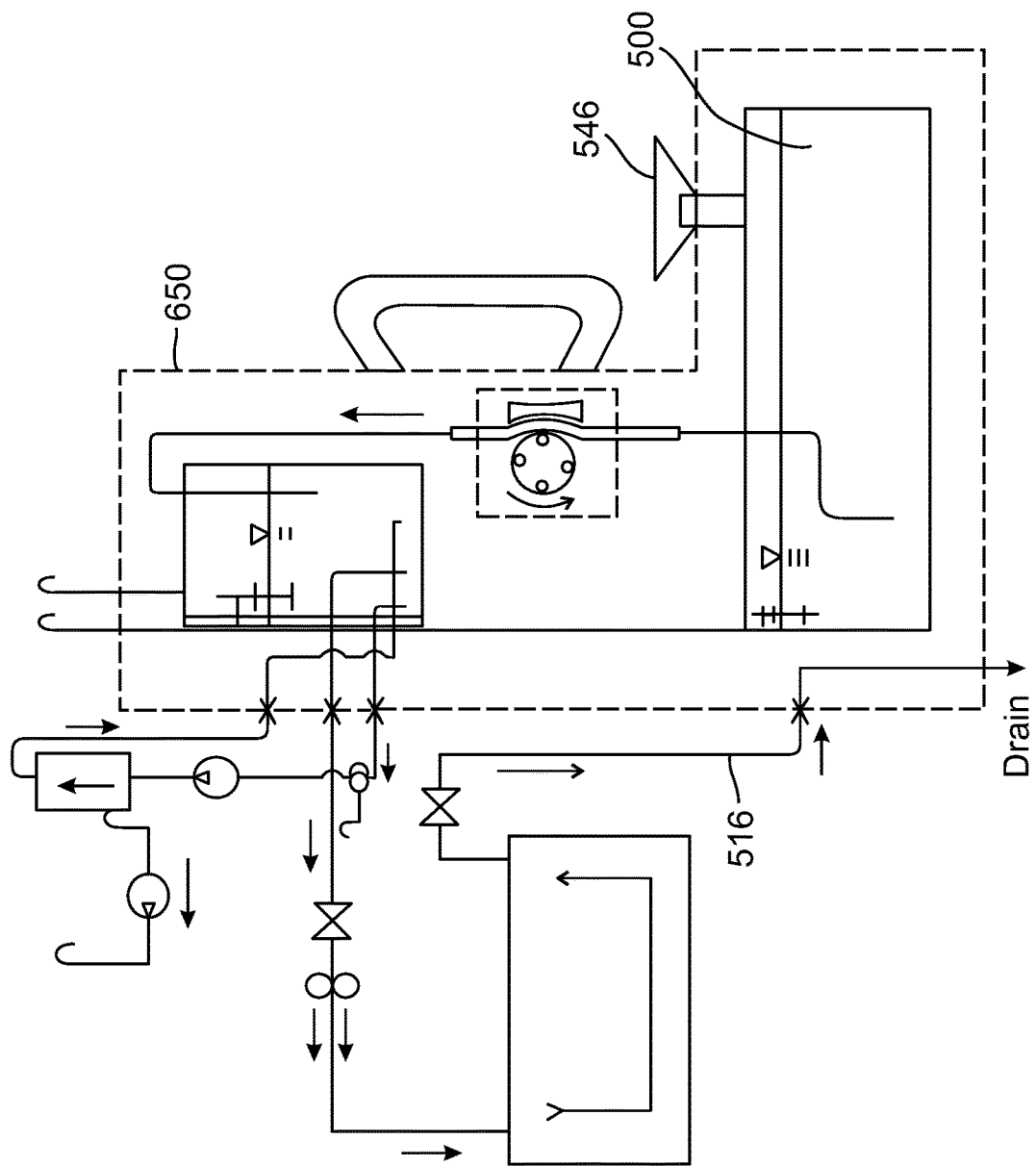
FIG. 17 is a simplified schematic diagram of an ink circulation unit with replaceable cleaning cassette in accordance with some embodiments of the present invention.

Reference is now made to FIG. 17 showing a simplified schematic diagram of an ink circulation unit with replaceable cleaning cassette in accordance with some embodiments of the present invention. According to some embodiments of the present invention, cartridge 550 (FIG. 16) is operable to be replaced by a cleaning fluid cartridge 650 during non-operational periods and/or prior to replacing the existing cartridge 550 with another cartridge, e.g. with different color shade and/or ink type. Typically, the ink circulation with cleaning fluid cartridge 650 is similar to that described in reference to FIG. 16. According to some embodiments of the present invention, lower tank 500 for cleaning fluid cartridge 650 is larger than that used for ink cartridges and includes a port 546 for adding cleaning fluid as required. According to some embodiments of the present invention, a return line 116 is connected to a draining port and cleaning fluid together with ink flowing to printheads 102 or 104 are drained to clean the system.

Figure 18:
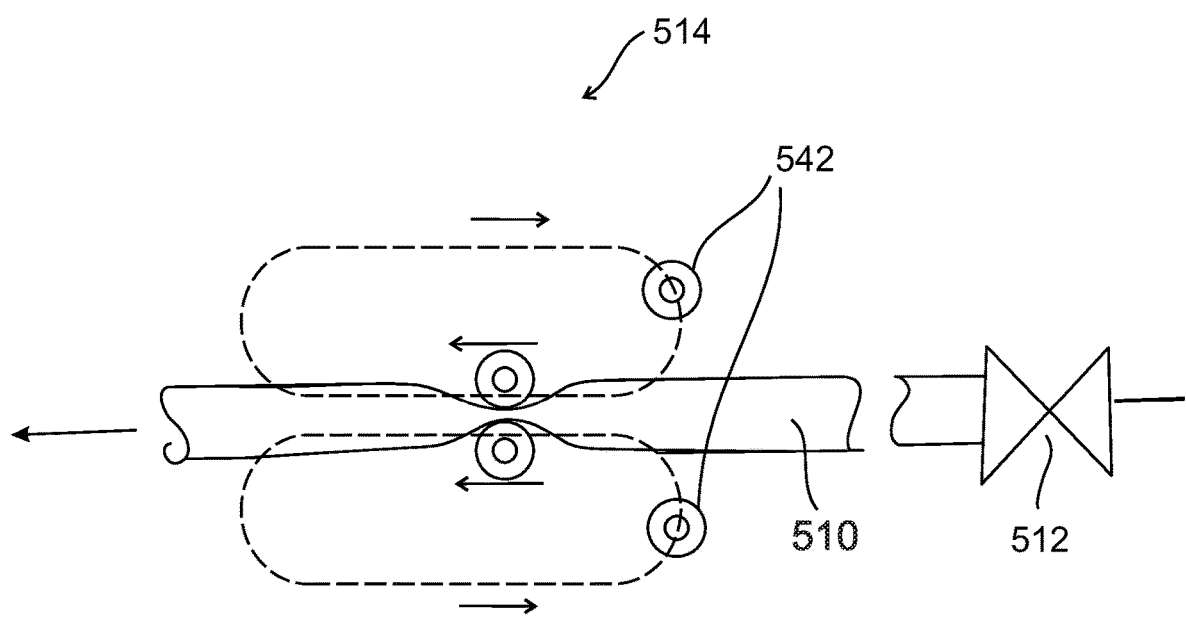
FIG. 18 is a simplified schematic diagram of a purging device for cleaning a nozzle of the printhead in accordance with some embodiments of the present invention.

Reference is now made to FIG. 18 showing a simplified schematic diagram of a purging device for cleaning a nozzle of the printhead in accordance with some embodiments of the present invention. According to some embodiments of the present invention, the ink circulation unit includes a dedicated purging device 514. Typically, dedicated purging device 514 is required since gravitation based circulation does not include a pump that can be applied for purging. According to some embodiments of the present invention, purging device includes a pair of rollers 542 that are operable to squeeze a portion of line 510 made from tubing that can typically be used with a peristaltic pump. According to some embodiments of the present invention, during a purging procedure, rollers 542 are driven in closed track along line 510 squeezing the tube over a given length and thereby generating a purge process. Typically, inlet valve 512 is maintained closed until rollers 542 substantially reach the given length at which point valve 512 is opened to expel the ink and complete the purging procedure. Typically, during printing, rollers 542 are not attached to line 510. In some exemplary embodiments, purging device 514 is also used for line priming when feed line 510 is empty. Optionally, in this case purging device 514 is operated as a peristaltic pump for initiate suction for line filling.

Ink

The present inventor has found that the ability to use water based ink that contains high volume percentage of high density pigments, particles and/or content such as ceramic and/or metal particles provides an option to fabricate three dimensional models using the described printing process. An exemplary ceramic ink, that may be suitable for direct inkjet printing as described herein is presented in Table 1.

TABLE 1

Typical composition of ceramic water based ink

| The component | % in volume | % in weight | The function |
| --- | --- | --- | --- |
| Zirconia powder, 250 nm average particle size. | 29% | 63% | Building material |
| Propylene glycol | 25% | 12.5% | humectants |
| H2O | 35% | 10% | Carrier |
| Binder of a polymeric resin and neutralizing composition | 7% | 3.5% | Binding the dry film. |
| Poly-acrylic acid dispersant | 0.7% | | dispersant |
| Non-Silicon surfactant | 0.3% | | Surface tension controller |

According to some embodiments of the present invention, a metal ink can be formulated by encapsulating metal micro particles in a pH sensitive polymer matrix and replacing the Zirconia powder with the encapsulated metal micro particles. Optionally, encapsulating is achieved with a suspension containing the polymer. Optionally, metal micro particles that are smaller than 1micrometer are used.

According to some embodiments of the present invention, a polymer ink is formulated with polyamide based polymer, e.g. Nylon 6 and/or Nylon 66. Optionally, water is used as a solvent. Optionally, water is used together with co-solvent, e.g. ethanol or with an additional solvent that has a high boiling point, or high solvency power. Typically, the additional solvent is used to increase the ink stability over time. An exemplary water based polymer ink is presented in Table 2.

TABLE 2

Exemplary water based soluble polymer ink.

| The component | % in volume | % in weight | The function |
| --- | --- | --- | --- |
| Nylon 6 flakes/water soluble polymer | 18-20% | 21% | Building material |
| Propylene glycol | 10% | 12.5% | humectants |
| H2O | 50% | 50% | Primary solvent |
| Ethanol | 15% | 12% | Secondary solvent |
| Furfuryl Alcohol | 5-7% | 4.5% | stabilizer |
| Non-Silicon surfactant | 0.3% | | Surface tension controller |

According to some embodiments of the present invention, the water based ink has relatively low boiling point. Optionally, when using this ink the printhead temperature is maintained below 35° C. and humectants are typically added. Typically, the addition of humectants necessitates adding more polymer which typically increases the viscosity of the ink. In some exemplary embodiments, ink viscosity is limited to around 20 cps due to the printhead jetting capabilities. Optionally, if the viscosity is too high, an alternate solution can be used in place of water.

According to some embodiments of the present invention, solvents, e.g. organic solvents with a relatively high boiling point, e.g. greater than 150° C. are used. Optionally, when using solvents with higher boiling points, the printhead temperature can be increased, e.g. to around 75° C. and the addition of humectants may not be required. As such the viscosity of this polymer ink can typically be lower than water based polymer inks. An example an organic solvent based polymer ink is presented in Table 3.

TABLE 3

Organic solvent based soluble polymer ink

| The component | % in volume | % in weight | The function |
| --- | --- | --- | --- |
| Nylon 6 flakes/ organic solvent soluble polymer | 45% | 50% | Building material |
| NMP (N-Methyl-2-pyrrolidone) | 45% | 40% | Primary solvent |
| Limonene | 10% | 10% | Secondary solvent |
| Non-Silicon surfactant | 0.3% | | Surface tension controller |

Support Material

According to some embodiments of the present invention, support material is required to hold overhanging or negative angled surfaces of the object e.g. surfaces that are not supported by the building table or a previously formed layer. Due to external forces, like gravity or the pressure roller, these surfaces may collapse. According to some embodiments of the present invention, support material is printed and/or dispensed in a layer wise manner similar to the manner in which the building material is printed and/or dispensed. Optionally, the support material can be applied after a layer of building material is completed, e.g. after an odd printing; first drying; even printing; second drying process. Alternatively, the support material can be dispensed together with the building material. Typically, the height of the support material droplets is required to match the height of the building material droplets. In some exemplary embodiments, wax is used as the support material. Optionally, the wax can be applied using a phase change material printhead similar to Xerox Phaser technology provided by Xerox and as described for example in Canadian Patent Application Publication No. CA2355533 entitled "Colorant compounds, phase change ink composition and methods of printing," the contents of which is incorporated herein by reference. In some exemplary embodiments, a drop volume of about 30-45 pico-liter is used for a 5 micrometer layer. In some exemplary embodiments, roller 144 is required to be used every layer to reduce the height of the support material to the correct layer height.

In some alternative exemplary embodiments, the support material is formulated with similar solvent composition and substantially same volume of solids as the building material ink. An exemplary support material ink, that may be suitable for direct inkjet printing as described herein is presented in Table 4.

TABLE 4 support material ink having liquid "solids"

| The component | % in volume | The function |
| --- | --- | --- |
| Glycerol/PEG300 | 36% | Support |
| H2O | 63% | Carrier |
| Poly-acrylic acid dispersant | 0.7% | Dispersant |
| Non-Silicon surfactant | 0.3% | Surface tension controller |

Optionally, support ink composition for a solvent based ink is configured based on a similar concept. In some exemplary embodiment, printhead 104 scans the layer after printhead 102. Typically the support material does not evaporate in the drying process in drying station 116 and is maintained intact. Optionally, when the support layer(s) is not sufficient for supporting, additional supporting columns may be added. Optionally, cages are built from the building material to support and/or avoid spilling of the support material.

In some alternative embodiments, support material is formulated from self crystallizing materials soluble in the water and/or solvent, e.g. such as sugar based solutions. Typically, self crystallizing materials can with withstand the fast drying process applied in the drying station. In some exemplary embodiments, binder is added to ink formulated from self crystalline materials to avoid powder spreading while drying the next model layer.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A method for direct inkjet printing by an additive manufacturing process to fabricate a part, the method comprising:

dispensing droplets of ink in a layerwise manner onto a building table according to a pattern defined for fabricating the part, wherein a layer is printed in a two step process and wherein the ink is formulated with at least one of ceramic powder, encapsulated metal microparticles and soluble polymer;

advancing the building table to a drying station after each of first and second step of the two step process; and drying the droplets of ink in at least one drying station after each of a first and second step of the two step process;

wherein the first step of the two step process includes scanning a first array of the droplets in a printing direction with one pixel gaps in a cross printing direction and wherein the second step of the two step process includes scanning a second array of the droplets in the printing direction with one pixel gaps in a cross printing direction, wherein the second array fills at least a portion of the one pixel gaps formed by the first array.

2. The method according to claim 1, comprising dispensing droplets of support material in a layerwise manner according to a pattern defined for supporting the part during fabrication, wherein a layer of droplets of support material is dispensed subsequent to forming a corresponding layer of the droplets of ink for fabricating the part.

3. The method according to claim 1, comprising rotating the layer by 90 degrees prior to printing a subsequent layer.

4. The method according to claim 1, wherein the droplets of ink are dispensed with a printhead including an array of nozzles and wherein the printhead is displaced by a half a pixel distance in a crossing printing direction prior to printing a subsequent layer.

5. The method according to claim 1, comprising sintering the part.

6. The method according to claim 1, further comprising: accelerating the building table in an opposite direction to exit the drying station after the drying process.

7. The method according to claim 1 comprising:
advancing a building tray to a first drying station after the first step of the two step process, wherein the building tray is configured for receiving the droplets of ink for fabricating the part; and advancing the building tray to a second drying station after the second step of the two step process.

8. The method according to claim 1, wherein the drying of the droplets of ink in a drying station comprises circulating hot air in the drying station.

9. The method according to claim 1, wherein the drying of the droplets of ink in a drying station comprises impinging jets of hot air on the droplets of ink.

10. The method according to claim 1, wherein the drying station is configured for drying ink that has a viscosity of 10-20 cps at a dispensing temperature.

11. The method according to claim 1, wherein the drying station is configured for drying ink that is formulated with at least one of ceramic powder, encapsulated metal microparticles and soluble polymer.

12. The method according to claim 1 comprising flattening layers of the droplets of ink once every plurality of layers.

13. The method according to claim 12, wherein the layers are flattened with a roller and wherein the roller is lowered toward the layers for performing the flattening on demand.

14. The method of claim 1 further comprising circulating the ink with gravitation based circulation in an ink delivery system prior to dispensing.

* * * * *